United States Patent
Gardner et al.

(10) Patent No.: US 7,359,402 B2
(45) Date of Patent: **\*Apr. 15, 2008**

(54) SYSTEM AND METHOD FOR CONFIGURING BANDWIDTH TRANSMISSION RATES FOR CALL CONNECTIONS

(75) Inventors: Michael Joseph Gardner, Prairie Village, KS (US); William Lyle Wiley, Atlanta, GA (US)

(73) Assignee: Sprint Communications Company L.P., Overland Park, KS (US)

( \* ) Notice: Subject to any disclaimer, the term of this patent is extended or adjusted under 35 U.S.C. 154(b) by 0 days.

This patent is subject to a terminal disclaimer.

(21) Appl. No.: 11/479,430

(22) Filed: Jun. 29, 2006

(65) Prior Publication Data

US 2006/0274769 A1    Dec. 7, 2006

Related U.S. Application Data

(63) Continuation of application No. 09/304,379, filed on May 4, 1999, now Pat. No. 7,103,068.

(51) Int. Cl.
*H04J 3/16* (2006.01)

(52) U.S. Cl. ............... 370/468; 370/352; 370/229

(58) Field of Classification Search ............ None
See application file for complete search history.

(56) References Cited

U.S. PATENT DOCUMENTS

| | | | |
|---|---|---|---|
| 4,491,945 A | 1/1985 | Turner | |
| 4,683,584 A | 7/1987 | Chang et al. | |
| 4,686,669 A | 8/1987 | Chang | |
| 4,686,701 A | 8/1987 | Ahmad et al. | |
| 4,720,850 A | 1/1988 | Oberlander et al. | |
| 4,730,312 A | 3/1988 | Johnson et al. | |
| 4,736,364 A | 4/1988 | Basso et al. | |
| 4,748,658 A | 5/1988 | Gopal et al. | |
| 4,757,526 A | 7/1988 | Foster et al. | |
| 4,763,317 A | 8/1988 | Lehman et al. | |
| 4,799,153 A | 1/1989 | Hann et al. | |
| 4,853,955 A | 8/1989 | Thorn et al. | |

(Continued)

FOREIGN PATENT DOCUMENTS

EP    0439098    7/1991

(Continued)

OTHER PUBLICATIONS

Kuribayashi, Shin-Ichi; Advanced Signaling Protocol for Broadband ISDN Services; Electronics and Communications in Japan; Part 1, vol. 78, No. 1, pp. 1-12.

(Continued)

*Primary Examiner*—Chi Pham
*Assistant Examiner*—Phuc H Tran

(57) ABSTRACT

A communication system comprises a signaling processor and an interworking unit. The signaling processor receives and processes signaling for a call to select a connection and a first bandwidth rate. The signaling processor transfers a first message indicating the connection and the first bandwidth rate. The interworking unit receives the first message and user communications for the call, and in response, transfers the user communications over the connection at the first bandwidth rate. The interworking unit detects a trigger in the user communications, and in response, transfers the user communications over the connection at a second bandwidth rate.

16 Claims, 23 Drawing Sheets

U.S. PATENT DOCUMENTS

| | | |
|---|---|---|
| 4,970,721 A | 11/1990 | Aczel et al. |
| 4,991,169 A | 2/1991 | Davis et al. |
| 4,991,172 A | 2/1991 | Cidon et al. |
| 5,003,584 A | 3/1991 | Benyacar et al. |
| 5,029,199 A | 7/1991 | Jones et al. |
| 5,048,081 A | 9/1991 | Gavaras et al. |
| 5,051,983 A | 9/1991 | Kammerl |
| 5,084,816 A | 1/1992 | Boese et al. |
| 5,089,954 A | 2/1992 | Rago |
| 5,115,426 A | 5/1992 | Spanke |
| 5,115,427 A | 5/1992 | Johnson, Jr. et al. |
| 5,185,743 A | 2/1993 | Murayama et al. |
| 5,204,857 A | 4/1993 | Obara |
| 5,251,255 A | 10/1993 | Epley |
| 5,258,979 A | 11/1993 | Oomuro et al. |
| 5,268,895 A | 12/1993 | Topper |
| 5,271,010 A | 12/1993 | Miyake et al. |
| 5,274,635 A | 12/1993 | Rahman et al. |
| 5,274,698 A | 12/1993 | Jang |
| 5,278,972 A | 1/1994 | Baker et al. |
| 5,282,244 A | 1/1994 | Fuller et al. |
| 5,289,472 A | 2/1994 | Cho |
| 5,291,492 A | 3/1994 | Andrews et al. |
| 5,297,147 A | 3/1994 | Shimokasa |
| 5,327,421 A | 7/1994 | Hiller et al. |
| 5,339,318 A | 8/1994 | Tanaka et al. |
| 5,345,443 A | 9/1994 | D'Ambrogio et al. |
| 5,345,445 A | 9/1994 | Hiller et al. |
| 5,345,446 A | 9/1994 | Hiller et al. |
| 5,363,433 A | 11/1994 | Isono |
| 5,375,124 A | 12/1994 | D'Ambrogio et al. |
| 5,377,186 A | 12/1994 | Wegner et al. |
| 5,392,402 A | 2/1995 | Robrock, II |
| 5,394,463 A | 2/1995 | Fischell et al. |
| 5,420,858 A | 5/1995 | Marshall et al. |
| 5,422,882 A | 6/1995 | Hiller et al. |
| 5,425,090 A | 6/1995 | Orriss |
| 5,428,609 A | 6/1995 | Eng et al. |
| 5,434,852 A | 7/1995 | La Porta et al. |
| 5,434,981 A | 7/1995 | Lenihan et al. |
| 5,438,527 A | 8/1995 | Feldbaumer et al. |
| 5,438,570 A | 8/1995 | Karras et al. |
| 5,440,563 A | 8/1995 | Isidoro et al. |
| 5,440,626 A | 8/1995 | Boyle et al. |
| 5,444,713 A | 8/1995 | Backaus et al. |
| 5,452,297 A | 9/1995 | Hiller et al. |
| 5,452,350 A | 9/1995 | Reynolds et al. |
| 5,457,684 A | 10/1995 | Bharucha et al. |
| 5,459,722 A | 10/1995 | Sherif |
| 5,469,501 A | 11/1995 | Otsuka |
| 5,473,677 A | 12/1995 | D'Amato et al. |
| 5,473,679 A | 12/1995 | La Porta et al. |
| 5,483,527 A * | 1/1996 | Doshi et al. ............... 370/399 |
| 5,485,455 A | 1/1996 | Dobbins et al. |
| 5,495,484 A | 2/1996 | Self et al. |
| 5,506,894 A | 4/1996 | Billings et al. |
| 5,509,010 A | 4/1996 | La Porta et al. |
| 5,519,690 A | 5/1996 | Suzuka et al. |
| 5,519,707 A | 5/1996 | Subramanian et al. |
| 5,530,724 A | 6/1996 | Abrams et al. |
| 5,533,115 A | 7/1996 | Hollenbach et al. |
| 5,537,461 A | 7/1996 | Bridges et al. |
| 5,541,917 A | 7/1996 | Farris |
| 5,544,163 A | 8/1996 | Madonna |
| 5,550,834 A | 8/1996 | D'Ambrogio et al. |
| 5,550,914 A | 8/1996 | Clarke et al. |
| 5,563,939 A | 10/1996 | La Porta et al. |
| 5,566,173 A | 10/1996 | Steinbrecher |
| 5,568,475 A | 10/1996 | Doshi et al. |
| 5,577,037 A | 11/1996 | Takatori et al. |
| 5,579,311 A | 11/1996 | Chopping et al. |
| 5,586,177 A | 12/1996 | Farris et al. |
| 5,590,133 A | 12/1996 | Billström et al. |
| 5,592,477 A | 1/1997 | Farris et al. |
| 5,600,643 A | 2/1997 | Robrock, II |
| 5,610,977 A | 3/1997 | Williams et al. |
| 5,619,561 A | 4/1997 | Reese |
| 5,623,491 A | 4/1997 | Skoog |
| 5,635,980 A | 6/1997 | Lin et al. |
| 5,636,261 A | 6/1997 | Fils |
| 5,640,446 A | 6/1997 | Everett et al. |
| 5,666,399 A | 9/1997 | Bales et al. |
| 5,673,262 A | 9/1997 | Shimizu |
| 5,689,550 A | 11/1997 | Garson et al. |
| 5,689,555 A | 11/1997 | Sonnenberg |
| 5,701,301 A | 12/1997 | Weisser, Jr. |
| 5,703,876 A | 12/1997 | Christie |
| 5,703,880 A | 12/1997 | Miura |
| 5,706,286 A | 1/1998 | Reiman et al. |
| 5,710,769 A | 1/1998 | Anderson et al. |
| 5,715,239 A | 2/1998 | Hyodo et al. |
| 5,745,553 A | 4/1998 | Mirville et al. |
| 5,751,706 A | 5/1998 | Land et al. |
| 5,765,108 A | 6/1998 | Martin et al. |
| 5,774,530 A * | 6/1998 | Montgomery et al. .. 379/112.01 |
| 5,774,675 A | 6/1998 | Uchida |
| 5,784,371 A | 7/1998 | Iwai |
| 5,793,765 A | 8/1998 | Boer et al. |
| 5,793,857 A | 8/1998 | Barnes et al. |
| 5,802,045 A | 9/1998 | Kos et al. |
| 5,825,780 A | 10/1998 | Christie |
| 5,828,666 A | 10/1998 | Focsancanu et al. |
| 5,850,391 A | 12/1998 | Essigmann |
| 5,862,334 A | 1/1999 | Schwartz et al. |
| 5,867,495 A | 2/1999 | Elliott et al. |
| 5,867,562 A | 2/1999 | Scherer |
| 5,867,571 A | 2/1999 | Borchering |
| 5,872,779 A | 2/1999 | Vaudreuil |
| 5,872,785 A | 2/1999 | Kienberger |
| 5,884,262 A | 3/1999 | Wise et al. |
| 5,892,764 A | 4/1999 | Riemann et al. |
| 5,915,009 A | 6/1999 | Williams et al. |
| 5,920,562 A | 7/1999 | Christie et al. |
| 5,926,464 A | 7/1999 | Fraser |
| 5,940,393 A | 8/1999 | Duree et al. |
| 5,940,491 A | 8/1999 | Anderson et al. |
| 5,940,492 A | 8/1999 | Galloway et al. |
| 5,949,791 A | 9/1999 | Byers et al. |
| 5,949,871 A | 9/1999 | Kabay et al. |
| 5,956,334 A | 9/1999 | Chu et al. |
| RE36,416 E | 11/1999 | Szlam et al. |
| 5,991,301 A | 11/1999 | Christie |
| 5,999,525 A | 12/1999 | Krishnaswamy et al. |
| 5,999,594 A | 12/1999 | Mizoguchi et al. |
| 6,002,689 A | 12/1999 | Christie et al. |
| 6,014,378 A | 1/2000 | Christie et al. |
| 6,026,091 A | 2/2000 | Christie et al. |
| 6,031,840 A | 2/2000 | Christie et al. |
| 6,034,950 A | 3/2000 | Sauer et al. |
| 6,038,218 A | 3/2000 | Otsuka et al. |
| 6,069,890 A | 5/2000 | White et al. |
| 6,088,749 A | 7/2000 | Hebert et al. |
| 6,137,800 A | 10/2000 | Wiley et al. |
| 6,141,339 A | 10/2000 | Kaplan et al. |
| 6,144,658 A | 11/2000 | Lebizay et al. |
| 6,175,574 B1 | 1/2001 | Lewis |
| 6,181,703 B1 | 1/2001 | Christie et al. |
| 6,185,215 B1 | 2/2001 | Aho |
| 6,249,572 B1 * | 6/2001 | Brockman et al. .......... 379/133 |
| 6,324,173 B1 | 11/2001 | Deschaine et al. |
| 6,324,179 B1 | 11/2001 | Doshi et al. |
| 6,324,279 B1 * | 11/2001 | Kalmanek et al. .......... 379/229 |
| 6,327,270 B1 | 12/2001 | Christie et al. |
| 6,385,193 B1 | 5/2002 | Civanlar et al. |

| | | | |
|---|---|---|---|
| 6,430,195 B1 | 8/2002 | Christie et al. | |
| 6,487,200 B1 | 11/2002 | Fraser | |
| 6,546,003 B1 | 4/2003 | Farris | |
| 6,546,442 B1 | 4/2003 | Davis et al. | |
| 6,560,241 B2 | 5/2003 | Christie et al. | |
| 6,690,674 B1 | 2/2004 | Christie et al. | |
| 6,765,903 B1 * | 7/2004 | Allen et al. ............... | 370/356 |
| 6,847,611 B1 | 1/2005 | Chase et al. | |
| 2004/0174880 A1 | 9/2004 | White et al. | |
| 2004/0193329 A1 | 9/2004 | Ransom et al. | |
| 2006/0023676 A1 | 2/2006 | Whitmore et al. | |

FOREIGN PATENT DOCUMENTS

| | | |
|---|---|---|
| EP | 0 488 399 | 6/1992 |
| HU | 71152 | 11/1995 |
| JP | 1013534 | 1/1989 |
| JP | 1300738 | 12/1989 |
| JP | 2215247 | 8/1990 |
| JP | 4180324 | 6/1992 |
| JP | 4196635 | 7/1992 |
| JP | 5327751 | 12/1993 |
| JP | 6006320 | 1/1994 |
| JP | 6209365 | 7/1994 |
| JP | 7177061 | 7/1995 |
| JP | 7250099 | 9/1995 |
| JP | 8149137 | 6/1996 |
| WO | WO9214321 | 8/1992 |

OTHER PUBLICATIONS

Hungarian office action dated Jun. 23, 1999 citing Hungarian patent No. HU170127 for Hungarian Application No. P9900232; 2 pages.

Russian office action dated Apr. 22, 2002 citing Russian patent Nos. RU2013011 and RU2007880 for Russian Application No. 99112956; 6 pages.

Hiroshi Ishii and Masatoshi Kawarasaki; B-ISDN Signalling Protocol Capabilities; NTT Telecommunication Networks Laboratories; 1989; pp. 41.2.1-41.2.5.

Manu Bahl, et al.; "The Evolving Intelligent Interexchange Network—An SS7 Perspective;" Proceedings of the IEEE; Apr. 1992; pp. 637-643; vol. 80, No. 4.

IBM International Technical Support Organization; "Networking Broadband Services (NBBS) Architecture Tutorial;" Jun. 1995; 248 pages; First Edition; Research Triangle Park, North Carolina, USA.

David J. Wright; "Voice over ATM: An Evaluation of Network Architecture Alternatives;" IEEE Network; Sep./Oct. 1996; pp. 22-27.

* cited by examiner

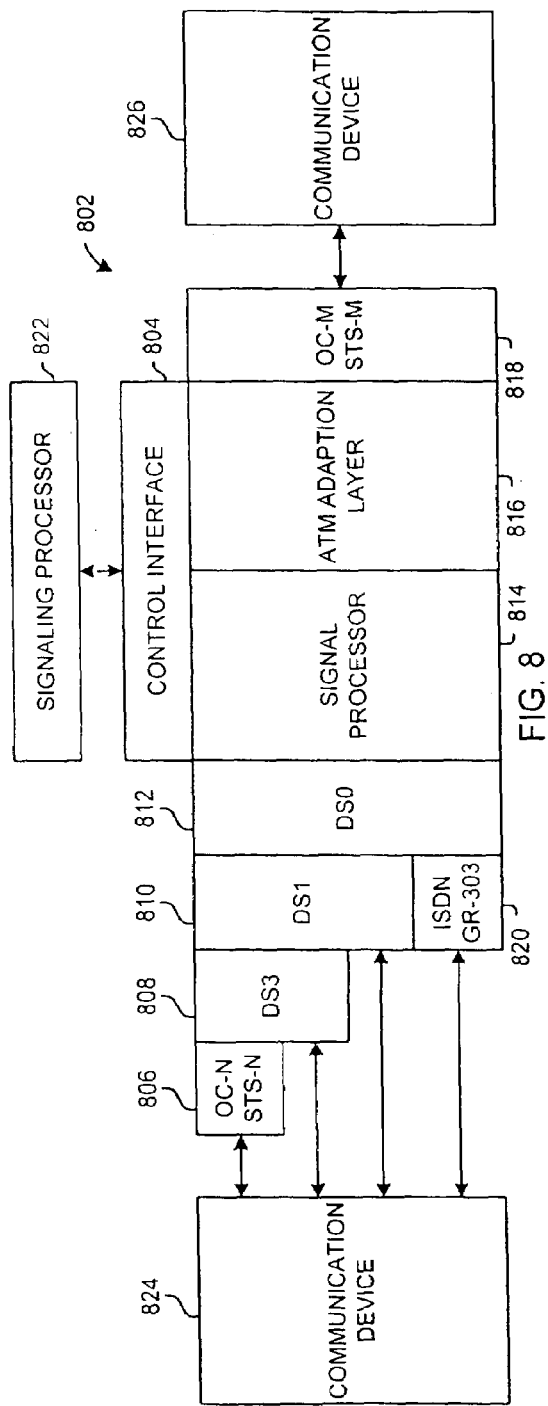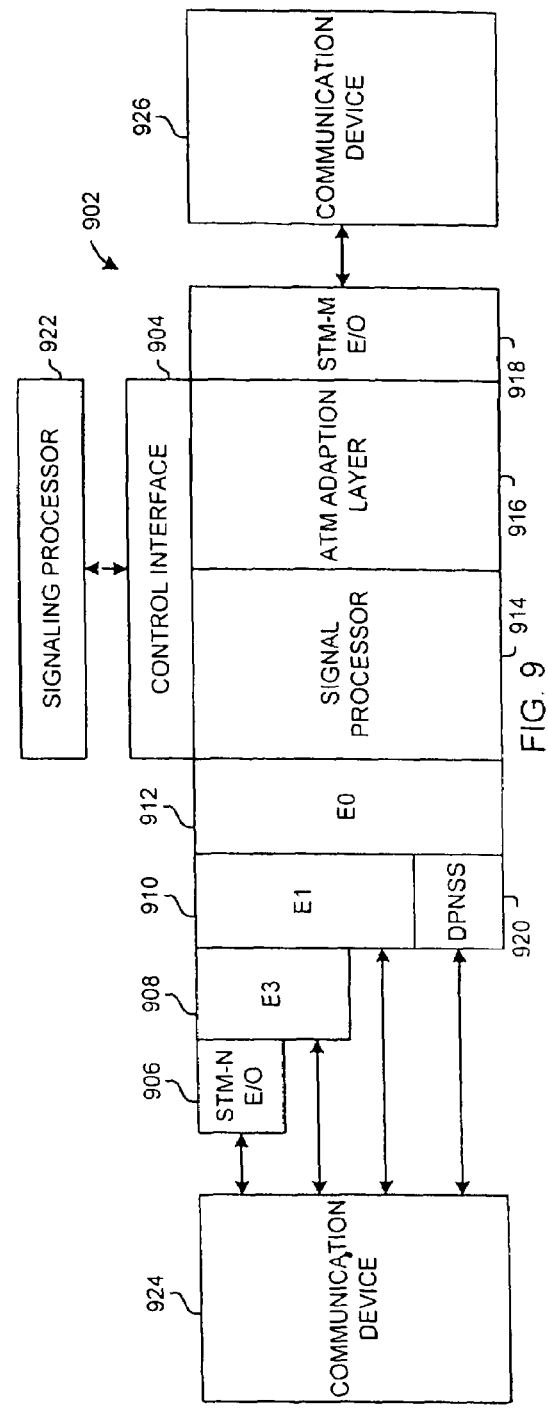

| TRUNK GROUP NUMBER | GROUP MEMBER | TCIC | EC LABEL | IWU LABEL | IWU PORT | DS1/E1 LABEL | DS1/E1 CHANNEL | INITIAL STATE |
|---|---|---|---|---|---|---|---|---|
| | | | | | | | | |
| | | | | | | | | |

FIG. 15

| TRUNK GROUP NUMBER | GROUP SIZE | STARTING CIC | TRANSMIT INTERFACE LABEL | TRANSMIT VPI | RECEIVE INTERFACE LABEL | RECEIVE VPI | INITIAL STATE |
|---|---|---|---|---|---|---|---|
| | | | | | | | |
| | | | | | | | |

FIG. 16

| TRUNK GROUP NUMBER | ADMIN INFORMATION | ASSOCIATED POINT CODE | CLLI | TRUNK TYPE | ASSOCIATED NPA | ASSOCIATED JIP | TIME ZONE LABEL | ECHO CANCELLER INFORMATION |
|---|---|---|---|---|---|---|---|---|
| | | | | | | | | |
| | | | | | | | | |

FIG. 17A

| SATELLITE | SELECT SEQUENCE | IWU PRIORITY | GLARE RESOLUTION | CONTINUITY CONTROL | REATTEMPTS | IGNORE LNP INFORMATION | TREATMENT LABEL | MESSAGE MAPPING LABEL |
|---|---|---|---|---|---|---|---|---|
| | | | | | | | | |
| | | | | | | | | |

FIG. 17B

| QUEUE | RING NO ANSWER | VOICE PATH CUT THROUGH | ORIGINATING COS LABEL | TERMINATING COS LABEL | CALL CONTROL | NEXT FUNCTION | NEXT LABEL |
|---|---|---|---|---|---|---|---|
| | | | | | | | |
| | | | | | | | |

FIG. 17C

| CARRIER LABEL | CARRIER ID | CARRIER SELECTION | NEXT FUNCTION | NEXT LABEL |
|---|---|---|---|---|
| | | | | |
| | | | | |

FIG. 18

| EXCEPTION LABEL | CALLING PARTY'S CATEGORY | CALLED NUMBER | | NEXT FUNCTION | NEXT LABEL |
|---|---|---|---|---|---|
| | | NATURE OF ADDRESS | DIGITS FROM | DIGITS TO | | |
| | | | | | | |

FIG. 19

| OLI LABEL | ORIGINATION LINE INFORMATION | NEXT FUNCTION | NEXT LABEL |
|---|---|---|---|
| | | | |
| | | | |

FIG. 20

| ANI LABEL | CHARGE CALLING PARTY NUMBER | | TIME ZONE LABEL | CUSTOMER INFORMATION | EC INFORMATION | QUEUE TREATMENT LABEL | NEXT FUNCTION | NEXT LABEL |
|---|---|---|---|---|---|---|---|---|
| | DIGITS FROM | DIGITS TO | | | | | | |
| | | | | | | | | |

FIG. 21

| CALLED NUMBER SCREENING LABEL | CALLED NUMBER | | | DELETE DIGITS | NEXT FUNCTION | NEXT LABEL |
|---|---|---|---|---|---|---|
| | NATURE OF ADDRESS | DIGITS FROM | DIGITS TO | | | |
| | | | | | | |

FIG. 22

| CALLED NUMBER LABEL | CALLED NUMBER | | NEXT FUNCTION | NEXT LABEL |
|---|---|---|---|---|
| | NATURE OF ADDRESS | DIGITS FROM | DIGITS TO | |
| | | | | |

FIG. 23

| DAY OF YEAR LABEL | DATE | NEXT FUNCTION | NEXT LABEL |
|---|---|---|---|
| | | | |

FIG. 24

| DAY OF WEEK | DAY FROM | DAY TO | NEXT FUNCTION | NEXT LABEL |
|---|---|---|---|---|
| | | | | |

FIG. 25

| TIME OF DAY LABEL | TIME FROM | TIME TO | NEXT FUNCTION | NEXT LABEL |
|---|---|---|---|---|
| | | | | |

FIG. 26

| TIME ZONE LABEL | UTC OFFSET | DAYLIGHT SAVINGS |
|---|---|---|
| | | |

FIG. 27

| ROUTING LABEL | ROUTE NUMBER | NEXT FUNCTION | NEXT LABEL | SIGNAL ROUTE LABEL |
|---|---|---|---|---|
| | | | | |
| | | | | |

FIG. 28

| ORIGINATING TRUNK COS LABEL | TERMINATING TRUNK COS LABEL | NEXT FUNCTION | NEXT LABEL |
|---|---|---|---|
| | | | |
| | | | |

FIG. 29

| TREATMENT LABEL | ERROR/CAUSE LABEL | NEXT FUNCTION | NEXT LABEL |
|---|---|---|---|
| | | | |
| | | | |

FIG. 30

| OUTGOING RELEASE LABEL | OUTGOING CAUSE VALUE | | |
|---|---|---|---|
| | LOCATION | CODING STANDARD | CAUSE VALUE |
| | | | |

FIG. 31

| PERCENT LABEL | CONTROL PERCENTAGE | CONTROL | | PASSED | |
|---|---|---|---|---|---|
| | | NEXT FUNCTION | NEXT LABEL | NEXT FUNCTION | NEXT LABEL |
| | | | | | |

| CALL RATE LABEL | CALL RATE | CONTROL | | PASSED | |
|---|---|---|---|---|---|
| | | NEXT FUNCTION | NEXT LABEL | NEXT FUNCTION | NEXT LABEL |
| | | | | | |

FIG. 34

| DATABASE SERVICES LABEL | SERVICE TYPE | SCCP LABEL | TCAP LABEL | NEXT FUNCTION | NEXT LABEL |
|---|---|---|---|---|---|
| | | | | | |

FIG. 35A

| SCCP LABEL | MESSAGE TYPE | PROTOCOL CLASS | MESSAGE HANDLING | HOP COUNTER | SEGMENTATION |
|---|---|---|---|---|---|
| | | | | | |

FIG. 35B

| ISNI TYPE | ROUTE INDICATOR | ISNI | | LABEL |
|---|---|---|---|---|
| | | MARK INDICATOR | | |

FIG. 35C

| | ADDRESS INDICATOR | | | CALLED PARTY ADDRESS | | | GLOBAL TITLE | | | |
|---|---|---|---|---|---|---|---|---|---|---|
| SSN | POINT CODE | GLOBAL TITLE INDICATOR | ROUTING INDICATOR | NATIONAL/ INTERNATIONAL | SUB SYSTEM NUMBER | POINT CODE NUMBER | TRANSLATION TYPE | ENCODE SCHEME | NUMBER PLAN | ADDRESS TYPE |
| | | | | | | | | | | |

FIG. 35D

| CALLING PARTY ADDRESS | | | | | | | | |
|---|---|---|---|---|---|---|---|---|
| ADDRESS INDICATOR | | | | | GLOBAL TITLE | | | |
| SSN | POINT CODE | GLOBAL TITLE INDICATOR | ROUTING INDICATOR | NATIONAL/ INTERNATIONAL | SUB SYSTEM NUMBER | POINT CODE NUMBER | TRANSLATION TYPE | ENCODE SCHEME | NUMBER PLAN | ADDRESS TYPE |
| | | | | | | | | | | |

FIG. 36

| ISNI LABEL | NETWORK 1 | NETWORK 2 | NETWORK 3 | NETWORK... | NETWORK 16 |
|---|---|---|---|---|---|
| | | | | | |

FIG. 37

| TCAP LABEL | TCAP TYPE | TAG CLASS | PACKAGE TYPE | COMPONENT TYPE | MESSAGE TYPE |
|---|---|---|---|---|---|
| | | | | | |

FIG. 38

| ECHO CANCELLER LABEL | ECHO CANCELLER TYPE | RS-232 ADDRESS | MODULE |
|---|---|---|---|
| | | | |

FIG. 39

| IWU LABEL | IWU ID | IP SOCKET 1 | IP SOCKET 2 | IP SOCKET 3 | IP SOCKET 4 |
|---|---|---|---|---|---|
| | | | | | |

FIG. 40

| CAM INTERFACE LABEL | CAM LABEL | LOGICAL INTERFACE |
|---|---|---|
| | | |

| CAM LABEL | CAM TYPE | CAM ADDRESS |
|---|---|---|
| | | |
| | | |

FIG. 41

| OFFICE CLLI NAME | SITE NODE ID | ORIGINATION ID | SOFTWARE ID | CALL PROCESSOR ID |
|---|---|---|---|---|
| | | | | |
| | | | | |

FIG. 42A

| ACC ENABLED | ACL 1 ONSET | ACL 1 ABATE | ACL 2 ONSET | ACL 2 ABATE | ACL 3 ONSET | ACL 3 ABATE |
|---|---|---|---|---|---|---|
| | | | | | | |
| | | | | | | |

FIG. 42B

| MAX TRUNKS OHQ | OHQ TQ1 | OHQ TQ2 | RING NO ANSWER TIMER | BILLING ACTIVE | NWM ALLOW | BILLING FAILURE FREE CALL |
|---|---|---|---|---|---|---|
| | | | | | | |
| | | | | | | |

FIG. 42C

| MAX HOP COUNTS | MAX TABLE LOOKUPS |
|---|---|
| | |
| | |

FIG. 42D

| AIN EVENT PARAMETERS LABEL | MESSAGE NAME #1 | MESSAGE NAME #.... | MESSAGE NAME #N |
|---|---|---|---|
| ACCESS CODE | | | |
| ACG ENCOUNTERED | | | |
| ALTERNATE BILLING INDICATOR | | | |
| ALTERNATE TRUNK GROUP | | | |
| AMA ALTERNATE BILLING NUMBER | | | |
| AMA BUSINESS CUSTOMER ID | | | |
| AMA DIGITS DIALED WC | | | |
| AMA LINE NUMBER | | | |
| AMA SLPID | | | |
| AMP | | | |
| ANSWER INDICATOR | | | |
| BEARER CAPABILITY | | | |
| BUSY CAUSE | | | |
| CALLED PARTY ID | | | |
| CALLED PARTY STATION TYPE | | | |
| CALLING PARTY BGID | | | |
| CARRIER | | | |
| CHARGE NUMBER | | | |
| CHARGE PARTY STATION TYPE | | | |
| CLEAR CAUSE | | | |
| COLLECTED ADDRESS INFORMATION | | | |
| COLLECTED DIGITS | | | |
| CONTROLLING LEG TREATMENT | | | |
| DISCONNECT FLAG | | | |
| DISPLAY TEXT | | | |
| FACILITY GID (TRUNK GROUP ID) | | | |
| FACILITY GID (PRIVATE FACILITY GID) | | | |
| FACILITY GID (ROUTE INDEX) | | | |
| FACILITY MEMBER ID | | | |
| FAILURE CAUSE | | | |
| GENERIC NAME | | | |
| ISDN INTERFACE ID | | | |
| LATA | | | |
| ORIGINAL CALLED PARTY ID | | | |
| OUTPULSE NUMBER | | | |
| OVERFLOW BILLING NUMBER | | | |
| PASSIVE LEG TREATMENT | | | |
| PRIMARY BILLING INDICATOR | | | |
| PRIMARY CARRIER | | | |
| PRIMARY TRUNK GROUP | | | |
| REDIRECTING PARTY ID | | | |
| REDIRECTION INFORMATION | | | |
| RESOURCE TYPE | | | |
| SECOND ALTERNATE BILLING INDICATOR | | | |
| SECOND ALTERNATE CARRIER | | | |
| SECOND ALTERNATE TRUNK GROUP | | | |
| SPID | | | |
| STR PARAMETER BLOCK | | | |

FIG. 43A

| AIN EVENT PARAMETERS LABEL | MESSAGE NAME #1 | MESSAGE NAME #.... | MESSAGE NAME #N |
|---|---|---|---|
| TCM | | | |
| TRIGGER CRITERIA TYPE | | | |
| USER ID | | | |
| VERTICAL SERVICE CODE | | | |
| APPLICATION ERROR STRING | | | |
| ERROR CAUSE | | | |
| FAILED MESSAGE | | | |
| CONNECT TIME | | | |
| CONTROL CAUSE INDICATOR | | | |
| ECHO DATA | | | |
| FACILITY STATUS | | | |
| GAP DURATION | | | |
| GAP INTERVAL (NATIONAL GAP INTERVAL) | | | |
| GAP INTERVAL (PRIVATE GAP INTERVAL) | | | |
| GLOBAL TITLE VALUE | | | |
| MONITOR TIME | | | |
| STATUS CAUSE | | | |
| TERMINATION INDICATOR | | | |
| TRANSLATION TYPE | | | |
| TRIGGER CRITERIA FLAG | | | |

FIG. 43B

| MESSAGE TYPE | PARAMETERS | INDEX #1 | INDEX #.... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | NOTIFICATION | | | |
| | BACKWARD CALL INDICATOR | | | |
| | ACCESS TRANSPORT | | | |
| | CAUSE INDICATOR | | | |
| | BACKWARD CALL INDICATOR | | | |
| CIRCUIT VALIDATION RESPONSE MESSAGE | CIRCUIT ID NAME | | | |
| | CLLI CODE | | | |
| CONTINUITY | CONTINUITY INDICATOR | | | |
| EXIT | DISPOSITION | | | |
| | TRUNK GROUP NUMBER | | | |
| | SEND BACK EXIT MESSAGE | | | |
| INITIAL ADDRESS | FORWARD CALL INDICATOR | | | |
| | CALLING PARTY'S CATEGORY | | | |
| | GENERIC ADDRESS PARAMETER (LNP) | | | |
| | CALLED PARTY NUMBER | | | |
| | CALLING PARTY NUMBER | | | |
| | GENERIC DIGITS | | | |
| | CHARGE NUMBER | | | |
| | ORIGINATING LINE INFORMATION | | | |
| | TRANSIT NETWORK SELECTION | | | |
| | CARRIER SELECTION INFORMATION | | | |
| | ORIGINATING LINE INFORMATION | | | |
| | SERVICE CODE | | | |
| | CARRIER IDENTIFICATION | | | |
| | ORIGINAL CALLED NUMBER | | | |
| | REDIRECTING NUMBER | | | |
| | REDIRECTION INFORMATION | | | |
| | GENERIC ADDRESS (NON-LNP) | | | |
| | ACCESS TRANSPORT | | | |
| | HOP COUNTER | | | |
| | JURISDICTION INFORMATION | | | |
| RELEASE | ACCESS TRANSPORT | | | |
| | AUTOMATIC CONGESTION CONTROL | | | |

FIG. 44

SYSTEM AND METHOD FOR CONFIGURING BANDWIDTH TRANSMISSION RATES FOR CALL CONNECTIONS

RELATED APPLICATIONS

This patent application is a continuation of U.S. patent application Ser. No. 09/304,379; filed on May 4, 1999 now U.S. Pat. No. 7,103,068; entitled "SYSTEM AND METHOD FOR CONFIGURING BANDWIDTH TRANSMISSION RATES FOR CALL CONNECTIONS;" and that is hereby incorporated by reference into this patent application.

FIELD OF INVENTION

The present invention relates to the field of telecommunications, and in particular, to connecting calls over connections with a designated bandwidth.

BACKGROUND OF THE INVENTION

Broadband systems provide telecommunications providers with many benefits, including greater bandwidth, more efficient use of bandwidth, and the ability to integrate voice, data, and video communications. These broadband systems provide callers with increased capabilities at lower costs.

A call has user communications and call signaling. Typically, the broadband systems transport user communications at a single transmission rate for all types of communications. In addition, call admission control methods are utilized by connecting equipment to prevent overloading and degraded quality of service due to congestion. Current call control methods include discarding calls or portions of calls or removing the connection that contains a particular call. However, call control methods are needed that do not drop calls or portions of calls. Also, methods and systems are needed to more efficiently use the bandwidth on one or more connections based on attributes of the calls on a call by call basis. The present invention fulfills these needs.

SUMMARY OF THE INVENTION

Examples of the invention include a communication system comprising a signaling processor and an interworking unit. The signaling processor receives and processes signaling for a call to select a connection and a first bandwidth rate. The signaling processor transfers a first message indicating the connection and the first bandwidth rate. The interworking unit receives the first message and user communications for the call, and in response, transfers the user communications over the connection at the first bandwidth rate. The interworking unit detects a trigger in the user communications, and in response, transfers the user communications over the connection at a second bandwidth rate.

In some examples of the invention, the signaling processor is configured to process a caller number to select the first bandwidth rate.

In some examples of the invention, the trigger comprises a tone.

In some examples of the invention, the user communications comprise voice communications.

In some examples of the invention, the first bandwidth rate is lower than the second bandwidth rate.

In some examples of the invention, the connection comprises a virtual connection.

In some examples of the invention, the connection comprises an asynchronous transfer mode connection.

In some examples of the invention, the signaling comprises signaling system seven signaling.

In some examples of the invention, the interworking unit transfers a second message to the signaling processor indicating the second bandwidth rate. In some examples of the invention, the signaling processor selects a billing rate for the call based on the second message.

BRIEF DESCRIPTION OF THE DRAWINGS

FIG. 8 is a functional diagram of an asynchronous transfer mode interworking unit for use with a synchronous optical network system in accordance with the present invention.

FIG. 9 is a functional diagram of an asynchronous transfer mode interworking unit for use with a synchronous digital hierarchy system in accordance with the present invention.

FIG. 15 is a table diagram of a time division multiplex trunk circuit table used in the signaling processor of FIG. 11.

FIG. 16 is a table diagram of an asynchronous transfer mode trunk circuit table used in the signaling processor of FIG. 11.

FIG. 17A is a table diagram of a trunk group table used in the signaling processor of FIG. 11.

FIG. 17B is a continuation table diagram of the trunk group table of FIG. 17A.

FIG. 17C is a table diagram of a continuation of the trunk group table of FIG. 17B.

FIG. 18 is a table diagram of a carrier table used in the signaling processor of FIG. 11.

FIG. 19 is a table diagram of an exception table used in the signaling processor of FIG. 11.

FIG. 20 is a table diagram of an originating line information table used in the signaling processor of FIG. 11.

FIG. 21 is a table diagram of an automated number identification table used in the signaling processor of FIG. 11.

FIG. 22 is a table diagram of a called number screening table used in the signaling processor of FIG. 11.

FIG. 23 is a table diagram of a called number table used in the signaling processor of FIG. 11.

FIG. 24 is a table diagram of a day of year table used in the signaling processor of FIG. 11.

FIG. 25 is a table diagram of a day of week table used in the signaling processor of FIG. 11.

FIG. 26 is a table diagram of a time of day table used in the signaling processor of FIG. 11.

FIG. 27 is a table diagram of a time zone table used in the signaling processor of FIG. 11.

FIG. 28 is a table diagram of a routing table used in the signaling processor of FIG. 11.

FIG. 29 is a table diagram of a trunk group class of service table used in the signaling processor of FIG. 11.

FIG. 30 is a table diagram of a treatment table used in the signaling processor of FIG. 11.

FIG. 31 is a table diagram of an outgoing release table used in the signaling processor of FIG. 11.

FIG. 32 is a table diagram of a percent control table used in the signaling processor of FIG. 11.

FIG. 33 is a table diagram of a call rate table used in the signaling processor of FIG. 11.

FIG. 34 is a table diagram of a database services table used in the signaling processor of FIG. 11.

FIG. 35A is a table diagram of a signaling connection control part table used in the signaling processor of FIG. 11.

FIG. 35B is a continuation table diagram of the signaling connection control part table of FIG. 35A.

FIG. 35C is a continuation table diagram of the signaling connection control part table of FIG. 35B.

FIG. 35D is a continuation table diagram of the signaling connection control part table of FIG. 35C.

FIG. 36 is a table diagram of an intermediate signaling network identification table used in the signaling processor of FIG. 11.

FIG. 37 is a table diagram of a transaction capabilities application part table used in the signaling processor of FIG. 11.

FIG. 38 is a table diagram of a external echo canceller table used in the signaling processor of FIG. 11.

FIG. 39 is a table diagram of an interworking unit used in the signaling processor of FIG. 11.

FIG. 40 is a table diagram of a controllable asynchronous transfer mode matrix interface table used in the signaling processor of FIG. 11.

FIG. 41 is a table diagram of a controllable asynchronous transfer mode matrix table used in the signaling processor of FIG. 11.

FIG. 42A is a table diagram of a site office table used in the signaling processor of FIG. 11.

FIG. 42B is a continuation table diagram of the site office table of FIG. 42A.

FIG. 42C is a continuation table diagram of the site office table of FIG. 42B.

FIG. 42D is a continuation table diagram of the site office table of FIG. 42C.

FIG. 43A is a table diagram of an advanced intelligent network event parameters table used in the signaling processor of FIG. 11.

FIG. 43B is a continuation table diagram of the advanced intelligent network event parameters table of FIG. 43A.

FIG. 44 is a table diagram of a message mapping table used in the signaling processor of FIG. 11.

DETAILED DESCRIPTION OF THE PREFERRED EMBODIMENTS

Figure 1:
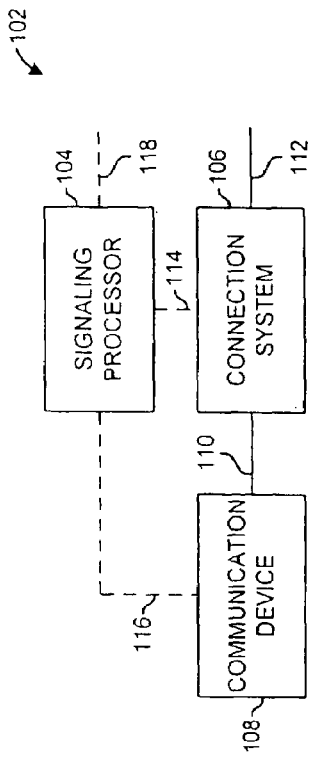
FIG. 1 is a block diagram of a call processing system in accordance with an embodiment of the present invention.

Telecommunication systems have a number of communication devices in local exchange and interexchange environments that interact to provide call services to customers. Both traditional and intelligent network (IN) services and resources are used to process, route, or connect a call to a designated connection.

A call has user communications and call signaling. The user communications contain the caller's information, such as a voice communication or data communication, and they are transported over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.931. A call can be connected to and from communication devices.

Connections are used to transport user communications and other device information between communication devices and between the elements and devices of the system. The term "connection" as used herein means the transmission media used to carry user communications between elements of the various telecommunications networks and systems. For example, a connection could carry a user's voice, computer data, or other communication device data. A connection can be associated with either in-band communications or out-of-band communications.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as that used in SS7, C7, ISDN, DPNSS, B-ISDN, GR-303, or could be via local area network (LAN), or data bus call signaling. A link can be, for example, an asynchronous transfer mode (ATM) adaptation layer 5 (AAL5) data link, user datagram protocol/internet protocol (UDP/IP), ethernet, digital signal level zero (DS0), or digital signal level one (DS1). In addition, a link, as shown in the figures, can represent a single physical link or multiple links, such as one link or a combination of links of ISDN, SS7, transmission control protocol/internet protocol (TCP/IP), or some other data link. The term "control message" as used herein means a control or signaling message, a control or signaling instruction, or a control or signaling signal, whether proprietary or standardized, that conveys information from one point to another.

The system of the present invention controls the transmission rates and associated bandwidth over connections and over links. Typically, the system of the present invention controls bearer channels used to transport user communications.

Multiple types of calls are connected by the system of the present invention. For example, a call may be a voice call, a data call, a facsimile call, a call using clear channel protocols, or others. Not all of the types of calls require the fastest transmission rate for a connection. For example, although it is preferred that a data call be transported using a bandwidth of 64 kilo-bits per second (Kbps), a voice call may be transported at 32 Kbps without degrading the quality of service (QoS) of the call. Thus, the present invention is capable of changing the bandwidth level used to transport the call based on the type of call.

In addition, during periods of increased call traffic, some calls may be transported at a lower transmission rate without degrading the QoS. This method of lowering the transmission rate, thereby reducing the bandwidth used for the call, may be used as a part of a call admission control (CAC) method. Thus, the present invention can control the bandwidth used to connect calls based on CAC methods.

The bandwidth control also can be implemented as a cost control measure. For example, a subscriber may be charged different rates based on the type of call and the bandwidth level that is used to connect the call. A particular call subscriber may subscribe to have all calls connected using a lower bandwidth level and, in return, receive a lower rate of charge for the calls. This may be implemented based on a subscriber profile or the automatic number identification (ANI) of the subscriber.

Several detection methods or triggers may be used to determine whether a call can be connected using a bandwidth level that is different than a default bandwidth level. The system can determine the bandwidth requirements and whether or not a particular bandwidth level may be used by processing a call signaling message, such as an SS7 message. Also, the system may determine that a particular bandwidth level may be used by receiving information within the user communications, such as a modem tone or a call trigger. Alternately, other subscriber based information may be used, for example, on a dedicated circuit or other call signaling. In addition, a particular bandwidth level may be used based upon congestion or potential congestion of a call connection network or other CAC methods. Methods other than the above examples may be used.

FIG. 1 illustrates an exemplary embodiment of a connection allocation system 102 of the present invention. The connection allocation system 102 includes a signaling processor 104 and a connection system 106. The connection system 106 is connected to a communication device 108 by a connection 110, and a connection 112 extends from the connection system 106. The signaling processor 104 is linked to the connection system 106 by a link 114 and to the communication device 108 by a link 116. A link 118 extends from the signaling processor 104.

The signaling processor 104 is a signaling platform that can receive, process, and generate call signaling. Based on the processed call signaling, the signaling processor 104 selects processing options, services, or resources for the user communications and generates and transmits control messages that identify the communication device, processing option, service, or resource that is to be used. The signaling processor 104 also selects virtual connections and circuit-based connections for call routing and generates and transports control messages that identify the selected connections. The signaling processor 104 can process various forms of signaling, including ISDN, GR-303, B-ISDN, SS7, and C7.

The signaling processor 104 operates to control the bandwidth for a call. The signaling processor 104 can base the control on control features including the information gained in the call signaling, subscriber information, network congestion or other CAC assertions, or the type of call application, such as voice, voice band data, facsimile, clear channel, or another data call. In addition, the signaling processor 104 may base the control on other control features, such as information received from the connection system 106.

Based on the control features, the signaling processor 104 determines the amount of bandwidth that is allocated to the call for the user communications. The signaling processor 104 may, for example, have a default selection of 64 Kbps and select a lower transmission rate if required. For example, the signaling processor 104 may select rates at 64 Kbps, 32 Kbps, 16 Kbps, 8 Kbps, or other rates.

In addition, the signaling processor 104 determines the proper encoding scheme, if any, which will be applied to the user communications. Examples of encoding are encryption, de-encryption, compression, decompression, and other signal processing. For example, user communications may be compressed at 32 Kbps, 16 Kbps, 8 Kbps or other rates with an encoding scheme for compression. Other encoding is contemplated to be within the scope of the invention. An example of an encoding scheme is described in a U.S. patent application Ser. No. 08/855,621 filed May 13, 1997, and entitled "System and Method For Transporting a Call" the contents of which is incorporated herein by reference.

The signaling processor 104 implements accounting measures based on the type of call and/or the transmission rate used to connect the call. For example, the signaling processor 104 can apply different accounting rate structures to voice calls, voiceband data/facsimile calls, clear channel calls, and other data calls. In addition, different accounting rate structures can be applied to 64 Kbps calls, 32 Kbps calls, 16 Kbps calls, and 8 Kbps calls. A preferred signaling processor is discussed below.

The connection system 106 makes connections for calls. The connection system 106 may interwork user communications to connections or switch user communications between connections. Preferably, interworking occurs between time division multiplex (TDM) connections and asynchronous transfer mode (ATM) connections, and switching occurs between ATM connections and other ATM connections and between TDM connections and other TDM connections. The connection system 106 establishes connections for user communications in response to control messages from the signaling processor 104.

The connection system 106 encodes the user communications according to a selected encoding scheme, if required, and transports the user communications at the selected transmission rate. For some calls, the connection system 106 encodes the user communications at the bearer channel level after the call has been setup. This may occur when the connection system 106 receives information through the user communications, such as tones and other call triggers.

The communication device 108 comprises customer premises equipment (CPE), a service platform, a switch, a remote digital terminal, a cross connect, an interworking unit, an ATM gateway, or any other device capable of initiating, handling, or terminating a call. CPE can be, for example, a telephone, a computer, a facsimile machine, or a private branch exchange. A service platform can be, for example, any enhanced computer platform that is capable of processing calls. A remote digital terminal is a device that concentrates analog twisted pairs from telephones and other like devices and converts the analog signals to a digital format known as GR-303. An ATM gateway is a device that changes ATM cell header virtual path/virtual channel (VP/VC) identifiers.

The system of FIG. 1 operates as follows. In a first example, the communication device 108 transmits call signaling to the signaling processor 104 and transports voiceband user communications to the connection system 106. The signaling processor 104 receives and processes the call signaling to determine one or more connections for the user communications and to determine the bandwidth that will be allocated to the user communications.

The signaling processor 104 determines that the user communications are to be connected over the connection 112. The signaling processor 104 also implements CAC procedures and determines that congestion may occur on the connection 112 at the site of the connection system 106. The signaling processor 104 determines that the call is a voice call and that the user communications can be connected at 16 Kbps without a degradation of QoS. The signaling processor 104 determines a bit encoding scheme so that the user communications may be transported at the 16 Kbps. For example, the signaling processor 104 may select a bit encoding scheme for 16 Kbps compression described in U.S. patent application Ser. No. 08/855,621 entitled "System and Method For Transporting a Call".

The signaling processor 104 transmits a control message to the connection system 106 identifying the connection 112 over which to connect the user communications, the 16 Kbps bandwidth to be used to connect the call, and the bit encoding scheme with which to transport the user communications. It will be appreciated that more than one control message may be transmitted. In addition, the signaling processor 104 transmits another control message over the link 118 to another signaling processor or switch identifying the connection 112 and a bit encoding scheme.

The connection system 106 receives the user communications from the communication device 108 and the control message from the signaling processor 104. The connection system 106 encodes the user communications for 16 Kbps and transports the user communications on the selected connection 112.

In a second example, the communication device 108 transmits call signaling to the signaling processor 104 and transports voiceband user communications to the connection system 106. The signaling processor 104 receives and processes the subscriber profile in the call signaling to determine one or more connections for the user communications and to determine the bandwidth that will be allocated to the user communications.

The signaling processor 104 determines that the user communications are to be connected over the connection 112. Based on the ANI of the subscriber profile, the signaling processor 104 determines that the calling party has subscribed to an accounting package for voiceband connections at a bandwidth that is lower than the default bandwidth and that the user communications are to be connected at 32 Kbps. The signaling processor 104 determines a bit encoding scheme so that the user communications may be transported at the 32 Kbps.

The signaling processor 104 transmits a control message to the connection system 106 identifying the connection 112 over which to connect the user communications, the 32 Kbps bandwidth to be used to connect the call, and the bit encoding scheme with which to transport the user communications. In addition, the signaling processor 104 transmits another control message over the link 118 to another signaling processor or switch identifying the connection 112 and the bit encoding scheme. Also, the signaling processor 104 notifies the accounting system (not shown) that the call was connected from a subscriber which has a designated subscriber package. The accounting system uses the call connection information to bill the subscriber.

The connection system 106 receives the user communications from the communication device 108 and the control message from the signaling processor 104. The connection system 106 encodes the user communications for 32 Kbps and transports the user communications on the selected connection 112.

In a third example, the communication device 108 transmits call signaling to the signaling processor 104 and transports facsimile user communications to the connection system 106. The signaling processor 104 receives and processes the call signaling to determine one or more connections for the user communications and to determine the bandwidth that will be allocated to the user communications.

The signaling processor 104 determines that the user communications are to be connected over the connection 112. The signaling processor 104 transmits a control message to the connection system 106 identifying the connection 112 over which to connect the user communications.

The connection system 106 receives the user communications from the communication device 108 and the control message from the signaling processor 104. The connection system 106 determines that call triggers, such as modem tones associated with facsimile calls, are being received from the communication device 108 and transmits a control message to the signaling processor 104 identifying the call trigger and/or as a facsimile call.

Preferably, in this example, the signaling processor 104 processes the control message from the connection system 106 and determines that the call requires a bandwidth, such as 64 Kbps. The signaling processor 104 transmits another control message to the connection system 106 specifying the 64 Kbps bandwidth for the connection 112. The signaling processor 104 also transmits another control message over the link 118 identifying the connection 112 and the selected bandwidth. The connection system 106 receives the control message and connects the user communications over the selected connection 112 at 64 Kbps.

It will be appreciated that the connection system 106 can be configured to connect the user communications to the connection 112 at the required bandwidth, such as 64 Kbps, without transmitting the control message to the signaling processor 104 and/or without having to receive a control message from the signaling processor 104 specifying the bandwidth with which to connect the user communications. In such a configuration, the connection system 106 connects the user communications at 64 Kbps upon receiving the call trigger, such as a modem tone, and then notifies the call processor 104 of the bandwidth used for the connection 112.

In a fourth example, the communication device 108 transmits call signaling, such as an SS7 message, to the signaling processor 104 and transports data user communications, such as clear channel data, to the connection system 106. The signaling processor 104 receives and processes the call signaling to determine one or more connections for the user communications and to determine the bandwidth that will be allocated to the user communications.

The signaling processor 104 determines that the user communications are to be connected over the connection 112. Based on the SS7 message, the signaling processor 104 determines that the call is a clear channel call and that the user communications are to be connected at 64 Kbps.

The signaling processor 104 transmits a control message to the connection system 106 identifying the connection 112 over which to connect the user communications and the bandwidth at which the user communications are to be transported. In addition, the signaling processor 104 transmits another control message over the link 118 to another signaling processor or switch identifying the connection 112.

The connection system 106 receives the user communications from the communication device 108 and the control message from the signaling processor 104. The connection system 106 connects the user communications over the selected connection 112 at 64 Kbps.

Figure 2:
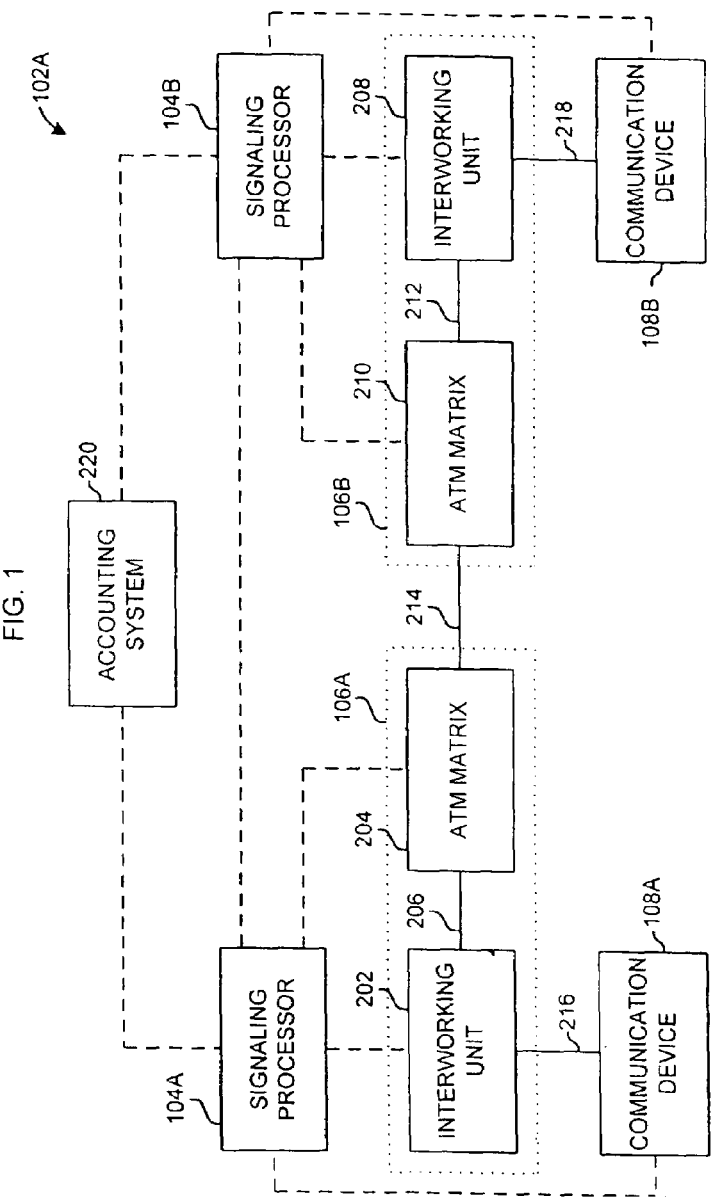
FIG. 2 is a block diagram of an expanded call processing system in accordance with an embodiment of the present invention.

FIG. 2 illustrates a connection allocation system 102A having an embodiment of a connection system of the present invention. The connection allocation system 102A has a first and second signaling processor 104A and 104B, a first and second connection system 106A and 106B, and a first and second communication device 108A and 108B. The signaling processors 104A and 104B and the communication devices 108A and 108B are the same as those described above.

The first connection system 106A has a first interworking unit 202 and a first ATM matrix 204 connected by a connection 206. The second connection system 106B has a second interworking unit 208 and a second ATM matrix 210 connected by a connection 212. The first ATM matrix 204 is connected to the second ATM matrix 210 by a connection 214. The first communication device 108A is connected to the first interworking unit 202 by a connection 216, and the second communication device 108B is connected to the second interworking unit 208 by a connection 218. The first and second signaling processors 104A and 104B are linked to an accounting system 220.

The first interworking unit 202 and the second interworking unit 208 each interwork traffic between various protocols. Preferably, the interworking units 202 and, 208 interwork between ATM traffic and non-ATM traffic, such as TDM traffic. The interworking units 202 and 208 operate in accordance with control messages received from the signaling processor 104. These control messages typically are provided on a call-by-call basis and typically identify an assignment between a DS0 and a VP/VC for which user communications are interworked. In some instances, the interworking units 202 and 208 may transport control messages which may include data to the signaling processor 104. Typically, the interworking units 202 and 208 are configured to provide the encoding of the user communications according to the encoding scheme. Although, in other instances, the ATM matrixes 204 and 210 may be configured to provide the encoding of the user communications according to the encoding scheme.

The ATM matrixes 204 and 210 are each a controllable ATM matrix that establishes connections in response to control messages received from the signaling processor 104. The ATM matrixes 204 and 210 are able to interwork between ATM connections and TDM connections. The ATM matrixes 204 and 210 also cross connect ATM connections with other ATM connections. In addition, the ATM matrixes 204 and 210 can switch calls from TDM connections to other TDM connections. The ATM matrixes 204 and 210 transmit and receive call signaling and user communications over the connections. The ATM matrixes 204 and 210 may be configured to provide the encoding of the user communications according to the encoding scheme.

The accounting system 220 receives accounting information, such as compiled call accounting information, other billing information, and other call connection information, from the signaling processors 104A and 104B. The accounting system 220 may compile the data and forward it to appropriate centers for processing and distribution or use the data for billing calls. An example of an accounting system is an enterprise system such as an operations center or a merged call processor (MCP) system.

The connection allocation system 102A of FIG. 2 operates as follows. In a first example, the first communication device 108A transmits call signaling to the first signaling processor 104A and transports user communications to the first interworking unit 202 over the connection 216.

The first signaling processor 104A receives and processes the call signaling to determine connections for the call and to determine the bandwidth required for the call. The first signaling processor 104A selects the connections 206 and 214 for the user communications and selects a bandwidth for the user communications. In this example, the first signaling processor 104A selects 64 Kbps as the bandwidth for the user communications based on the subscriber profile in the call signaling. It will be appreciated that any of the transmission rates described herein and based on the methods for selecting the transmission rates may be used.

The first signaling processor 104A transmits a control message to the first interworking unit 202 designating the connection 206 and the bandwidth for the user communications. The first signaling processor 104A also transmits a control message to the first ATM matrix 204 designating a connection 214 over which the user communications will be connected. In addition, the first signaling processor 104A transmits a control message to the second signaling processor 104B designating the connection 214 and the bandwidth for the user communications. Also, the first signaling processor 104A transmits a control message to the accounting system 220 identifying the bandwidth used for the call and the subscriber information.

The first interworking unit 202 receives the user communications from the first communication device 108A and the control message from the first signaling processor 104A. The first interworking unit 202 interworks the user communications to the connection 206 at 64 Kbps as designated by the first signaling processor 104A. In this example, the first interworking unit 104A interworks the user communications from TDM to ATM.

The first ATM matrix 204 receives the user communications over the connection 206 and the control message from the first signaling processor 104A. The first ATM matrix 204 connects the user communications to the connection 214 designated by the first signaling processor 104A at the designated bandwidth of 64 Kbps. In this example, the first ATM matrix 204 connects the user communications from an ATM VP/VC to another ATM VP/VC.

The second signaling processor 104B receives the control message transmitted by the first signaling processor 104A. It will be appreciated that this control message may be, for example, an SS7 message, a proprietary control message, or another message. In this example, this control message is an SS7 message.

The second signaling processor 104B processes the control message to select connections for the calls. The second signaling processor 104B transmits a control message to the second ATM matrix 210 designating a connection 212 over which the user communications will be connected. The second signaling processor 104B transmits a control message to the second interworking unit 208 designating the connection 218 for the user communications, the bandwidth at which the user communications will be received, and the bandwidth at which the user communications will be interworked. In this example, the second signaling processor 104B designates that the user communications will be interworked at 64 Kbps.

In addition, the second signaling processor 104B transmits a control message to the second communication device 108B containing call information. In this example, the control message sent to the second communication device 108B is an SS7 message.

The second ATM matrix 210 receives the user communications over the connection 214 and the control message from the second signaling processor 104B. The second ATM matrix 210 connects the user communications to the connection 212 designated by the second signaling processor 104B at the bandwidth that the user communications were received. In this example, the second ATM matrix 210 connects the user communications from an ATM VP/VC to another ATM VP/VC.

The second interworking unit 208 receives the user communications from the second ATM matrix 210 and the control message from the second signaling processor 104B. The second interworking unit 208 interworks the user communications to the connection 218 from the 64 Kbps bandwidth at which the user communications were received to a required bandwidth selected by the signaling processor 104B. In this example, the second signaling processor 104B selected a bandwidth of 64 Kbps and designated the bandwidth of 64 Kbps in the control message. However, the second interworking unit 208 can be configured to interwork the user communications at a specified default bandwidth without having to receive a control message specifying that default bandwidth. In this example, the second interworking unit 104B interworks the user communications from ATM to TDM.

The second communication device 108B receives the user communications from the second interworking unit 208. The second communication device 108B also receives the control message from the second signaling processor 104B.

It will be appreciated that the signaling processors 104A and 104B may transmit a single control message that contains designations for the selected connection, the selected bandwidth, and the selected encoding scheme, if any, for the user communications. Alternately, two or more control messages may be transmitted containing designations for the selected connection, the selected bandwidth, and the selected encoding scheme, if any, for the user communications.

Referring still to FIG. 2, in a second example, the first communication device 108A transmits call signaling to the first signaling processor 104A and transports user communications to the first interworking unit 202 over the connection 216.

The first signaling processor 104A receives and processes the call signaling to determine connections for the call and to determine the bandwidth required for the call. The first signaling processor 104A selects the connections 206 and 214 for the user communications and selects a bandwidth for the user communications. In this example, the call is a voice call, and the first signaling processor 104A selects 32 Kbps as the bandwidth for the user communications based on the CAC methods. It will be appreciated that any of the transmission rates described herein and based on the methods for selecting the transmission rates may be used.

The first signaling processor 104A transmits a control message to the first interworking unit 202 designating the connection 206, the bandwidth, and the encoding scheme for connecting the user communications. Also, the first signaling processor 104A transmits a control message to the first ATM matrix 204 designating a connection 214 over which the user communications will be connected. In addition, the first signaling processor 104A transmits a control message to the second signaling processor 104B designating the connection 214, the bandwidth, and the encoding scheme for the user communications.

The first interworking unit 202 receives the user communications from the first communication device 108A and the control message from the first signaling processor 104A. The first interworking unit 202 interworks the user communications to the connection 206 at 32 Kbps using the encoding scheme designated by the first signaling processor 104A.

The first ATM matrix 204 receives the user communications over the connection 206 and the control message from the first signaling processor 104A. The first ATM matrix 204 connects the user communications to the connection 214 designated by the first signaling processor 104A at the designated bandwidth of 32 Kbps.

The second signaling processor 104B receives the control message transmitted by the first signaling processor 104A. It will be appreciated that this control message may be, for example, an SS7 message, a proprietary control message, or another message. In this example, this control message is a proprietary message.

The second signaling processor 104B processes the control message to select connections for the calls. The second signaling processor 104B transmits a control message to the second ATM matrix 210 designating a connection 212 over which the user communications will be connected. The second signaling processor 104B also transmits a control message to the second interworking unit 208 designating the connection 218 for the user communications and the bandwidth and the decoding scheme at which the user communications will be interworked. The control message may include the bandwidth and the encoding scheme at which the user communications will be received. In addition, the second signaling processor 104B transmits a control message to the second communication device 108B containing call information. In this example, the control message sent to the second communication device 108B is an SS7 message.

The second ATM matrix 210 receives the user communications over the connection 214 and the control message from the second signaling processor 104B. The second ATM matrix 210 connects the user communications to the connection 212 designated by the second signaling processor 104B at the bandwidth that the user communications were received.

The second interworking unit 208 receives the user communications from the second ATM matrix 210 and the control message from the second signaling processor 104B. The second interworking unit 208 interworks the user communications to the connection 218 from the 32 Kbps bandwidth at which the user communications were received to a required bandwidth using the decoding scheme designated by the second signaling processor 104B. In this example, the second signaling processor 104B selected a bandwidth of 64 Kbps and designated the bandwidth of 64 Kbps in the control message.

The second communication device 108B receives the user communications from the second interworking unit 208. The second communication device 108B also receives the control message from the second signaling processor 104B.

It will be appreciated that the signaling processors 104A and 104B may transmit a single control message that contains designations for the selected connection, the selected bandwidth, and the selected encoding or decoding scheme, if any, for the user communications. Alternately, two or more control messages may be transmitted containing designations for the selected connection, the selected bandwidth, and the selected encoding or decoding scheme, if any, for the user communications.

Still referring to FIG. 2, in another example, call signaling is received by the second signaling processor 104B. It will be appreciated that this call signaling may be, for example, an SS7 message, a proprietary control message, or another message. In this example, this call signaling is an SS7 message. User communications are received by the second ATM matrix 210.

The second signaling processor 104B processes the call signaling to select connections for the calls. The second signaling processor 104B transmits a control message to the second ATM matrix 210 designating a connection 212 over which the user communications will be connected. The second signaling processor 104B transmits a control message to the second interworking unit 208 designating the connection 218 over which the user communications will be interworked.

In addition, the second signaling processor 104B transmits call signaling to the second communication device 108B containing call information. In this example, the call signaling sent to the second communication device 108B is an SS7 message.

The second ATM matrix 210 receives the user communications over the connection 214 and the control message from the second signaling processor 104B. The second ATM matrix 210 connects the user communications to the connection 212 designated by the second signaling processor 104B at the bandwidth that the user communications were received. In this example, the second ATM matrix 210 connects the user communications from an ATM VP/VC to another ATM VP/VC.

The second interworking unit 208 receives the user communications from the second ATM matrix 210 and the control message from the second signaling processor 104B. The second interworking unit 208 determines that the user communications are encoded with a bit encoding scheme. In this example, the user communications are compressed to 32 Kbps, although other encoding schemes may be used.

The second interworking unit 208 is configured to decode the user communications according to the required decoding scheme upon detection of a bit encoding scheme. In this example, the second interworking unit 208 is configured to decompress the user communications to 64 Kbps. The second interworking unit 208 also interworks the user communications to the connection 218 in accordance with the control message from the second signaling processor 104B.

The second communication device 108B receives the user communications from the second interworking unit 208. The second communication device 108B also receives the control message from the second signaling processor 104B.

Referring again to FIG. 2, in another example, call signaling is received by the second signaling processor 104B. It will be appreciated that this call signaling may be, for example, an SS7 message, a proprietary control message, or another message. In this example, this call signaling is a non-proprietary control message. User communications are received by the second ATM matrix 210.

The second signaling processor 104B processes the call signaling to select connections for the calls. The second signaling processor 104B transmits a control message to the second ATM matrix 210 designating a connection 212 over which the user communications will be connected. The second signaling processor 104B transmits a control message to the second interworking unit 208 designating the connection 218 over which the user communications will be interworked.

In addition, the second signaling processor 104B transmits call signaling to the second communication device 108B containing call information. In this example, the call signaling sent to the second communication device 108B is a non-proprietary control message.

The second ATM matrix 210 receives the user communications over the connection 214 and the control message from the second signaling processor 104B. The second ATM matrix 210 connects the user communications to the connection 212 designated by the second signaling processor 104B at the bandwidth that the user communications were received. In this example, the second ATM matrix 210 connects the user communications from an ATM VP/VC to another ATM VP/VC.

The second interworking unit 208 receives the user communications from the second ATM matrix 210 and the control message from the second signaling processor 104B. The second interworking unit 208 determines that the user communications are encoded with a bit encoding scheme. In this example, the user communications are encrypted, although other encoding schemes may be used.

The second interworking unit 208 is configured to decode the user communications according to the required decoding scheme upon detection of a bit encoding scheme. In this example, the second interworking unit 208 is configured to de-encrypt. The second interworking unit 208 also interworks the user communications to the connection 218 in accordance with the control message from the second signaling processor 104B.

The second communication device 108B receives the user communications from the second interworking unit 208. The second communication device 108B also receives the control message from the second signaling processor 104B.

Again referring to FIG. 2, in another example, call signaling is received by the second signaling processor 104B. It will be appreciated that this call signaling may be, for example, an SS7 message, a proprietary control message, or another message. In this example, this call signaling is an SS7 message. User communications are received by the second ATM matrix 210.

The second signaling processor 104B processes the call signaling to select connections for the calls. The second signaling processor 104B transmits a control message to the second ATM matrix 210 designating a connection 212 over which the user communications will be connected. The second signaling processor 104B transmits a control message to the second interworking unit 208 designating the connection 218 over which the user communications will be interworked.

In addition, the second signaling processor 104B transmits call signaling to the second communication device 108B containing call information. In this example, the call signaling sent to the second communication device 108B is an SS7 message.

The second ATM matrix 210 receives the user communications over the connection 214 and the control message from the second signaling processor 104B. The second ATM matrix 210 determines that the user communications are encoded with a bit encoding scheme. In this example, the user communications are compressed to 16 Kbps, although other encoding schemes may be used.

The second ATM matrix 210 is configured to decode the user communications according to the required decoding scheme upon detection of a bit encoding scheme. In this example, the second ATM matrix 210 is configured to decompress the user communications to 64 Kbps. Thus, the second ATM matrix 210 decompresses the user communications and connects the user communications to the connection 212 designated by the second signaling processor 104B at the designated bandwidth.

The second interworking unit 208 receives the user communications from the second ATM matrix 210 and the control message from the second signaling processor 104B. The second interworking unit 208 interworks the user communications to the connection 218 in accordance with the control message from the second signaling processor 104B.

The second communication device 108B receives the user communications from the second interworking unit 208. The second communication device 108B also receives the control message from the second signaling processor 104B.

It will be appreciated that in an alternate configuration, the second interworking unit 208 may be configured to detect encoded user communications. In such as configuration, the second interworking unit would decode the user communications according to a pre-configured decoding scheme.

Processing Logic

The above-described figures illustrate the selection of connections and the allocation of the bandwidth for those connections. The remaining figures detail the processing of various call signaling messages. These figures use the service description language (SDL) nomenclature. In SDL, rectangles indicate processes, and diamonds represent decisions. Pointed rectangles represent messages sent, and indented rectangles represent messages received. If the point or indent is on the left, the messages related to the origination side of the call. If the point or indent is on the right, the messages relate to the termination side of the call. In the following discussion, a transition from one figure to another will be indicated by placing the new figure in parenthesis.

Figure 3A:
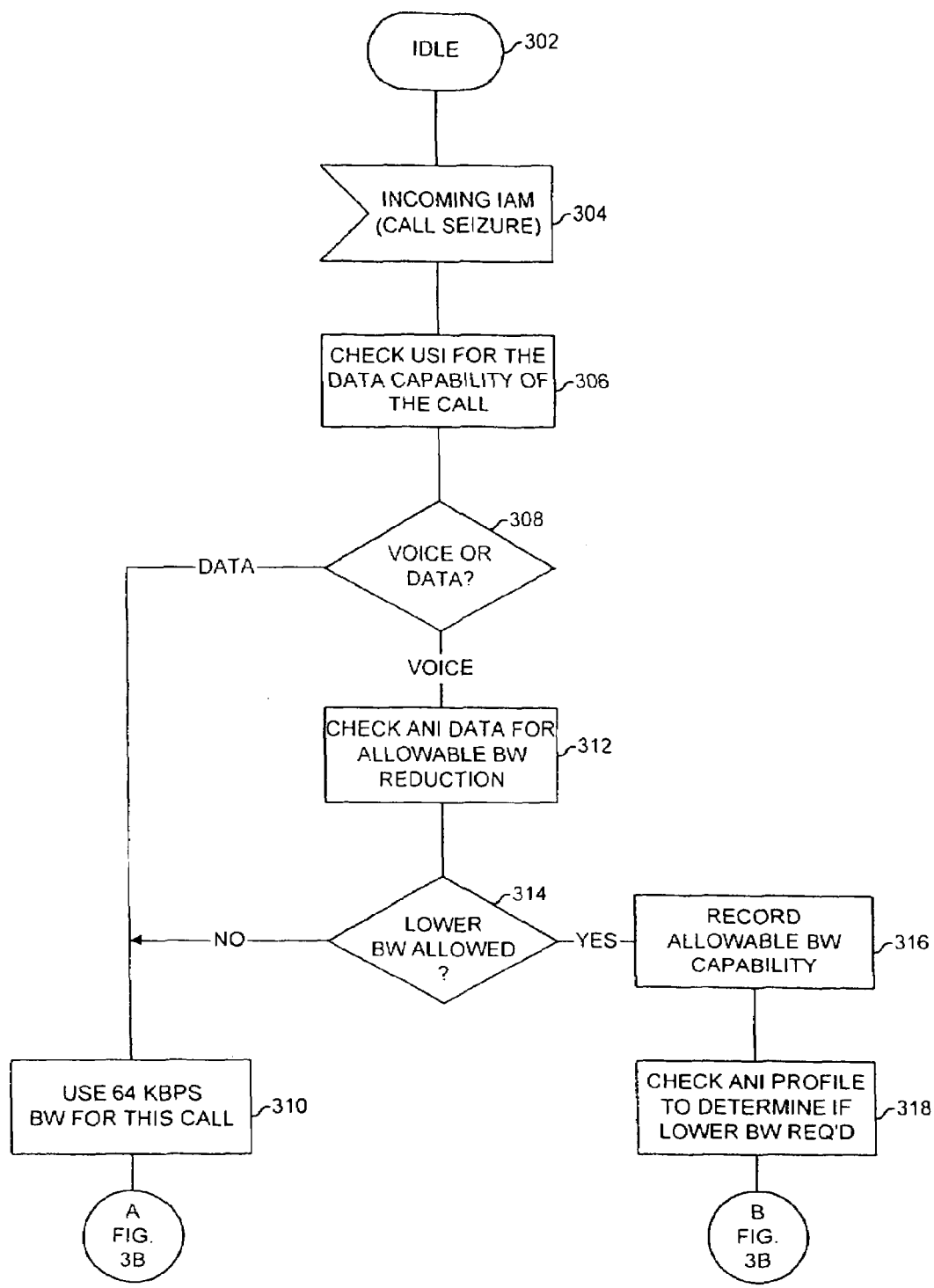
FIG. 3A is a flow diagram of call processing logic for bandwidth allocation.
Figure 3B:
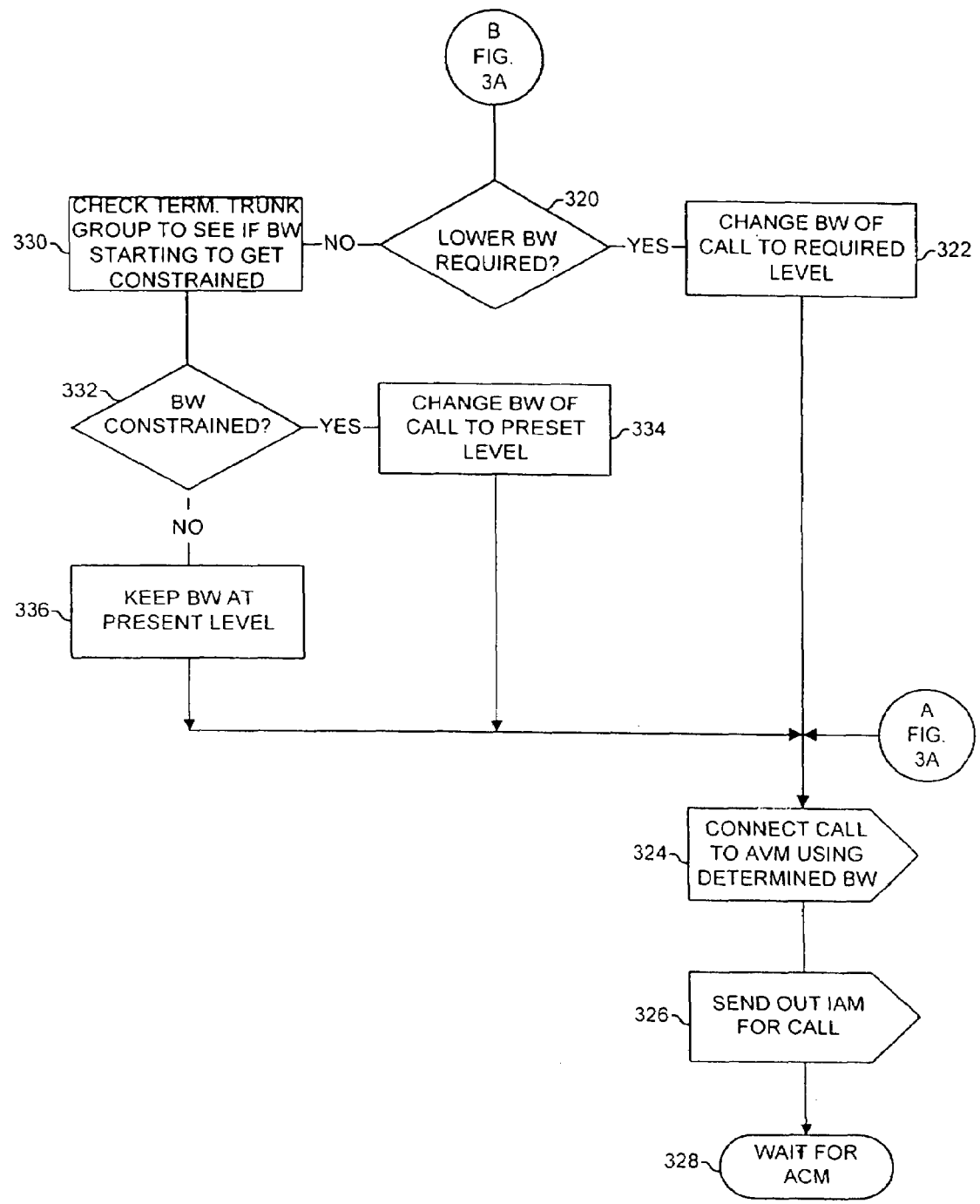
FIG. 3B is a continuation of FIG. 3A.

FIGS. 3A-3B illustrate an example of call processing logic used to allocate bandwidth for the connections. The process begins with step 302 in the idle state. If an incoming initial address message (IAM) is received by the signaling processor at 304, the user service information (USI) is checked to determine data capability for the call at 306. The call is checked to determine whether it is a voice call or a data call at 308, If the call is a data call at 308, then 64 Kbps is to be used as the bandwidth allocated for the call 310. The call processing then continues at step 324 (FIG. 3B)

If it is determined that the call is a voice call at 308, the ANI data in the call signaling is checked to determine if it is allowable for the bandwidth to be reduced to a lower level at 312. If a lower level of bandwidth is not allowed to be used for the call at 314, then 64 Kbps will be used as the bandwidth to connect the call at 310. The call processing then continues at step 324 (FIG. 3B.) If a lower level of bandwidth may be used at 314, then the allowable bandwidth capability is recorded by the signaling processor 316. The ANI profile in the call signaling is checked to determine if a lower bandwidth is required for the call at 318.

If a lower bandwidth is required for the call at 320 (FIG. 3B), then the bandwidth allocated for the connection of the call is changed to the required lower level at 322. A control message is sent to the interworking unit to connect the call at the bandwidth level determined by the signaling processor at 324. In IAM is transmitted to the next switch or signaling processor at 326. At 328, the signaling processor waits for an acknowledgment message (ACM).

If a lower bandwidth is not required at 320, then the terminating trunk group is checked to determine if the bandwidth for the connection is becoming congested or otherwise constrained 330. If the bandwidth is starting to become constrained at 332, then the bandwidth is changed to a preset level, such as 32 Kbps, at 334. If the bandwidth is not becoming constrained at 332, then the bandwidth is kept at the present level at 336. After either of step 334 or step 336, processing continues at step 324 where a control message is sent to the interworking unit identifying the bandwidth to be used to connect the call. An IAM is transmitted to the next switch or signaling processor at 326. The signaling processor then waits for an ACM at 328.

Figure 4A:
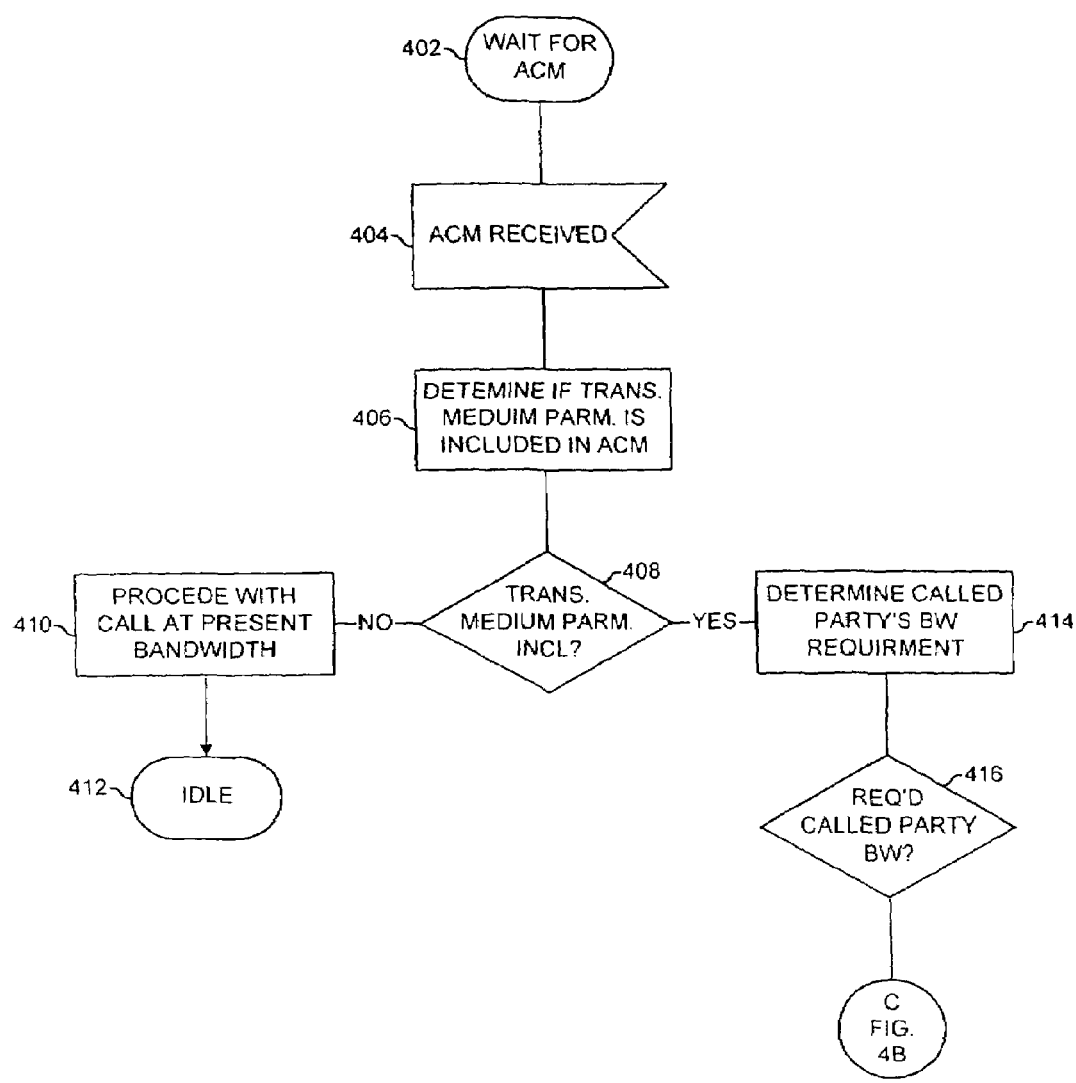
FIG. 4A is a flow diagram of continuing call processing logic for bandwidth allocation.
Figure 4B:
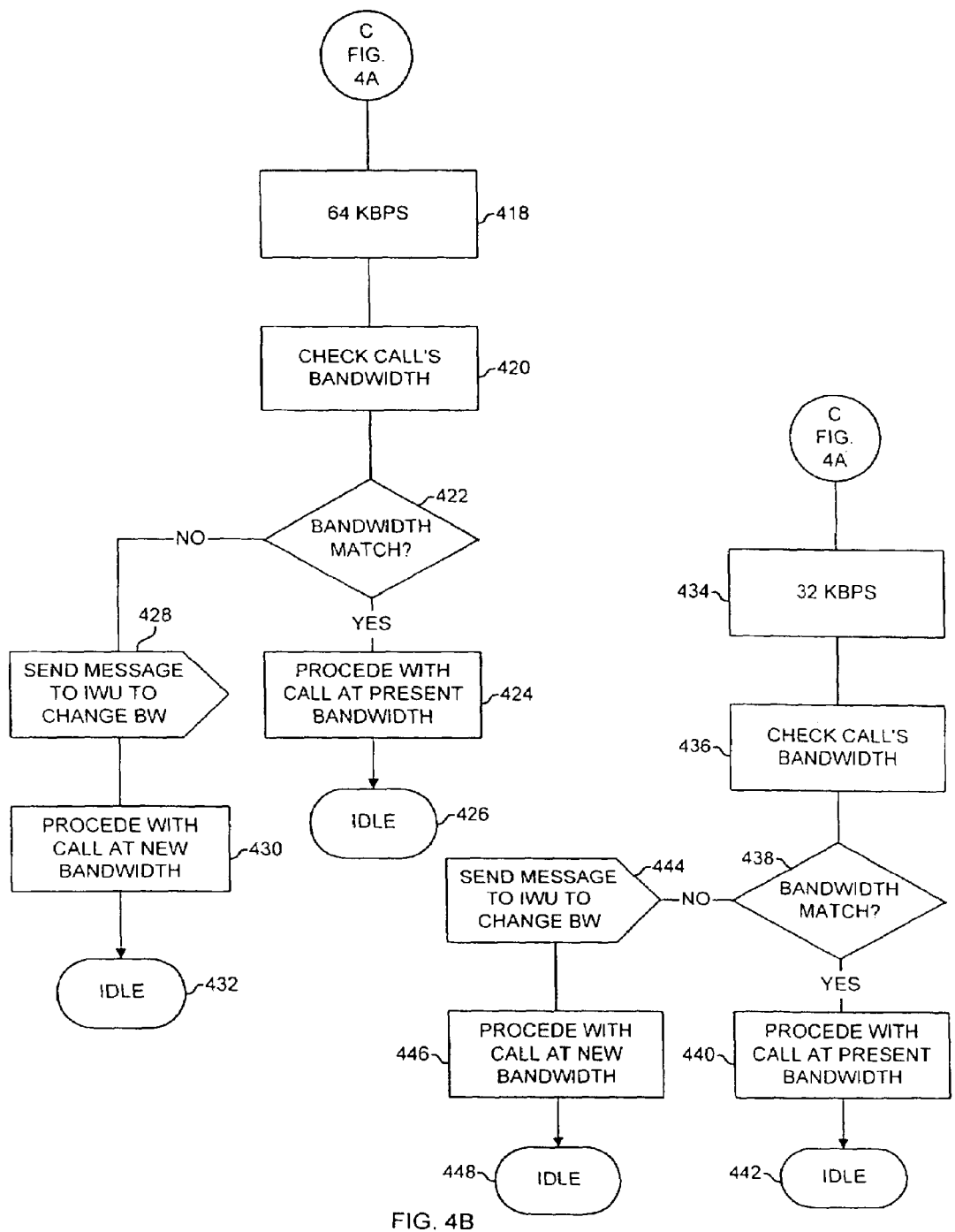
FIG. 4B is a continuation of FIG. 4A.

FIGS. 4A-4B illustrate additional call logic for the allocation of bandwidth when the signaling processor is waiting for an ACM at 402. If an ACM is received at 404, it is determined if the transmission medium parameter is included in the ACM message at 406. If the transmission medium parameter is not included at 408, the call is connected at the present default bandwidth level at 410. The system goes to idle at 412. If the transmission medium parameter is included at 408, the called party's bandwidth requirement is determined at 414 and 416.

If the called party requires a bandwidth of 64 Kbps at 418, the call's bandwidth usage, which is recorded in the signaling processor, is checked at 420 (FIG. 4B). If the bandwidth required by the called party matches the bandwidth level recorded in the signaling processor at 422, then the call is connected at the present bandwidth at 424. The system returns to idle at 426.

If the bandwidth required by the called party does not match with the bandwidth level recorded by the signaling processor at 422, a control message is sent to the interworking unit to change the bandwidth to the bandwidth level required by the called party at 428. The call then is connected at the new bandwidth at 430. This system goes to idle at 432.

If it is determined at step 416 (FIG. 4A) that the called party requires a bandwidth of 32 Kbps at 434 (FIG. 4B), then the call's bandwidth used, which is recorded in the signaling processor, is checked at 436. If the bandwidth required by the called party matches the bandwidth level recorded by the signaling processor at 438, then the call is connected at the present bandwidth at 440. The system then goes to idle at 442.

If the bandwidth required by the called party did not match the bandwidth recorded by the signaling processor at 438, then a control message is sent to the interworking unit to change the bandwidth to the bandwidth required by the called party at 444. The call then is connected at the new bandwidth at 446, and the system goes to idle at 448.

Figure 4C:
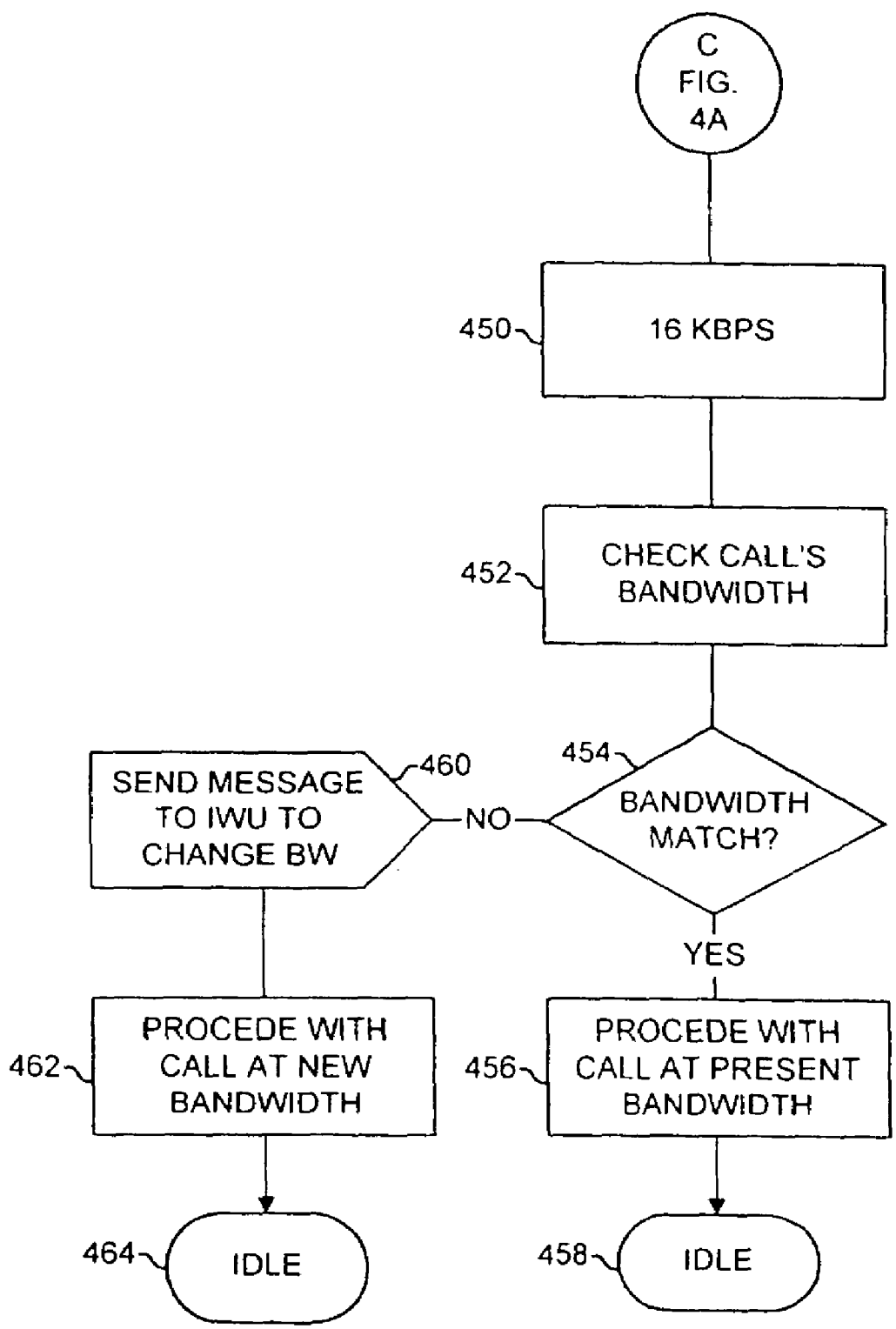
FIG. 4C is a continuation of FIG. 4A.

If at 416 (FIG. 4A) it is determined that the called party requires a bandwidth of 16 Kbps at 450 (FIG. 4C), then the call's bandwidth usage, which is recorded by the signaling processor, is checked at 452. If the bandwidth required by the called party matches the bandwidth recorded by the signaling processor at 454, then the call is connected at the present bandwidth at 456. The system then goes to idle at 458.

If the bandwidth required by the called party does not match the bandwidth recorded by the signaling processor at 454, then a control message is sent to the interworking unit to change the bandwidth to the bandwidth required by the called party at 460. The call then is connected at the new bandwidth at 462, and the system goes to idle at 464.

Figure 5:
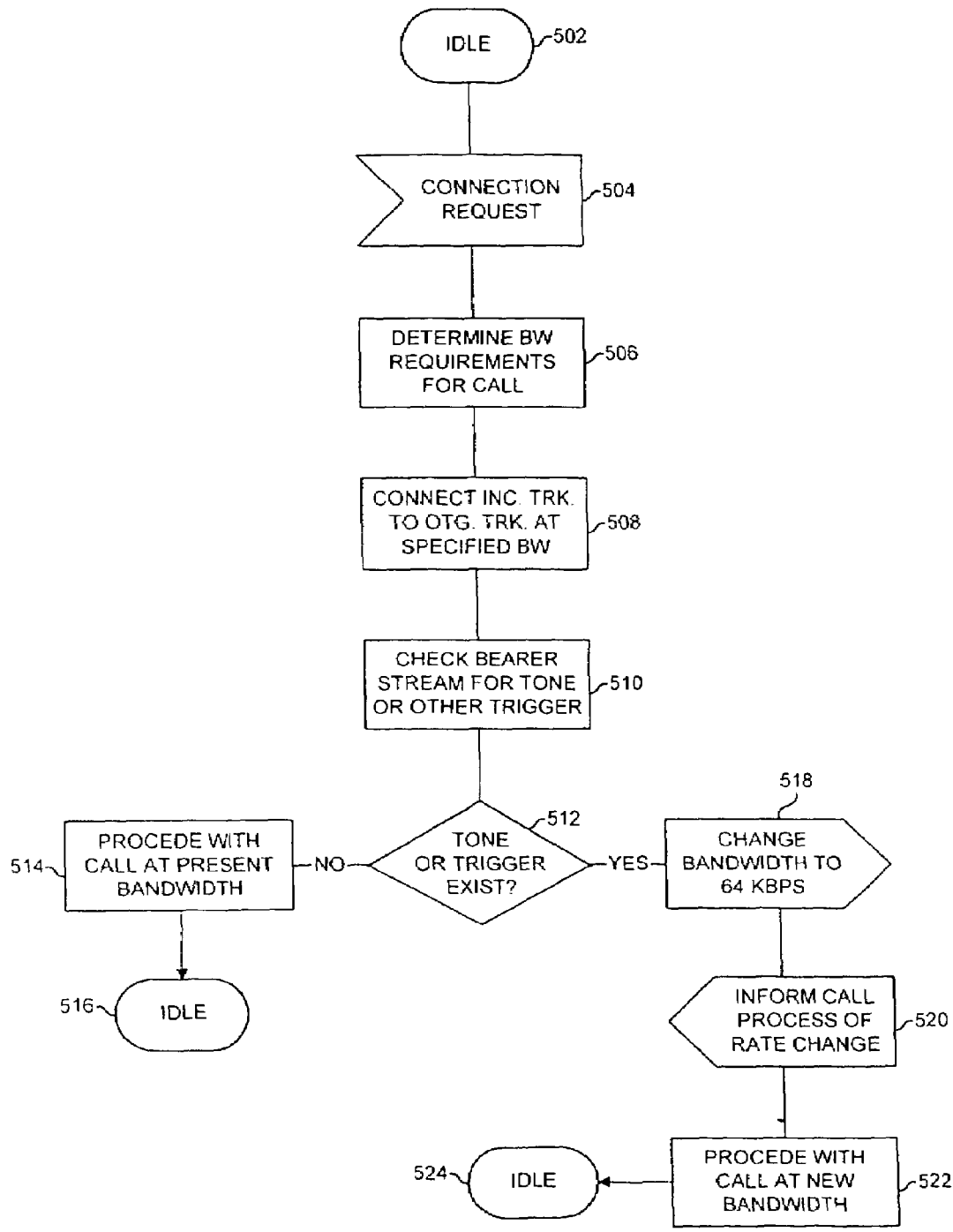
FIG. 5 is a flow diagram of interworking unit processing logic for bandwidth allocation.

FIG. 5 illustrates information processing that occurs in the interworking unit for the allocation of bandwidth for a call connection. The system is idle at 502. If a control message that requests a connection is received from signaling processor at 504, the bandwidth requirements for the call are determined at 506. The incoming trunk connection is connected to the outgoing trunk at the specified bandwidth at 508. It will be appreciated that the incoming trunk and the outgoing trunk connection may be of any specified type, including a TDM trunk and an ATM trunk. The bearer stream for the connection of the user communications is checked for modem tones or other triggers at 510. If a modem tone or other trigger does not exist at 512, the call is connected at the present bandwidth at 514. The system returns to idle 516.

If a modem tone or other trigger does exist at 512, the bandwidth level for the connection is changed to 64 Kbps at 518. A control message is sent to the signaling processor informing it of the transmission rate change at 520. The call then is connected at the new bandwidth at 522, and the system returns to idle at 524.

The Controllable ATM Matrix

Figure 6:
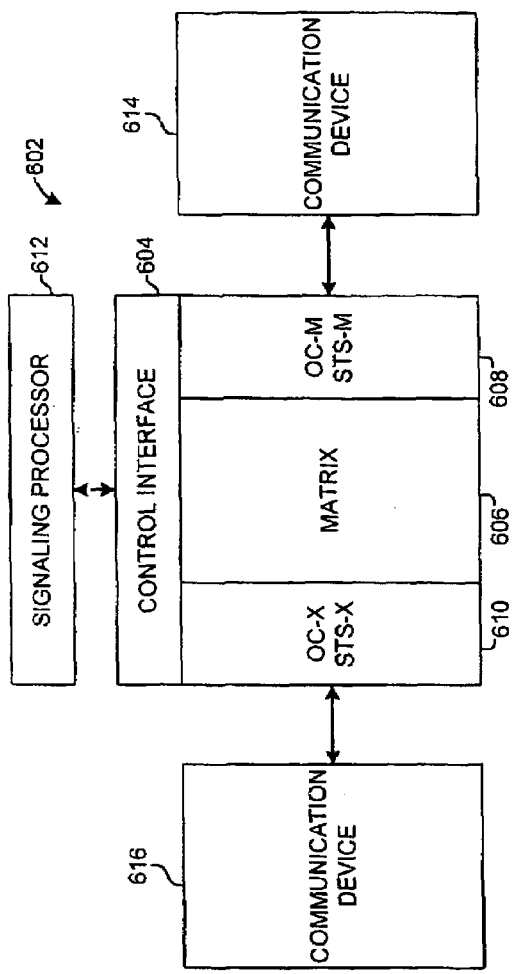
FIG. 6 is a functional diagram of a controllable asynchronous transfer mode matrix in accordance with the present invention.

FIG. 6 illustrates an exemplary embodiment of a controllable asynchronous transfer mode (ATM) matrix (CAM), but other CAMs that support the requirements of the invention also are applicable. The CAM 602 may receive and transmit ATM formatted user communications or call signaling.

The CAM 602 preferably has a control interface 604, a controllable ATM matrix 606, an optical carrier-M/synchronous transport signal-M (OC-M/STS-M) interface 608, and an OC-X/STS-X interface 610. As used herein in conjunction with OC or STS, "M" refers to an integer, and "X" refers to an integer.

The control interface 604 receives control messages originating from the signaling processor 612, identifies virtual connection assignments in the control messages, and provides these assignments to the matrix 606 for implementation. The control messages may be received over an ATM virtual connection and through either the OC-M/STS-M interface 608 or the OC-X/STS-X interface 610 through the matrix 606 to the control interface 604, through either the OC-M/STS-M interface or the OC-X/STS-X interface directly to the control interface, or through the control interface from a link.

The matrix 606 is a controllable ATM matrix that provides cross connect functionality in response to control messages from the signaling processor 612. The matrix 606 has access to virtual path/virtual channels (VP/VCs) over which it can connect calls. For example, a call can come in over a VP/VC through the OC-M/STS-M interface 608 and be connected through the matrix 606 over a VP/VC through the OC-X/STS-X interface 610 in response to a control message received by the signaling processor 612 through the control interface 604. Alternately, a call can be connected in the opposite direction. In addition, the a call can be received over a VP/VC through the OC-M/STS-M interface 608 or the OC-X/STS-X interface 610 and be connected through the matrix 606 to a different VP/VC on the same OC-M/STS-M interface or the same OC-X/STS-X interface.

The OC-M/STS-M interface 608 is operational to receive ATM cells from the matrix 606 and to transmit the ATM cells over a connection to the communication device 614. The OC-M/STS-M interface 608 also may receive ATM cells in the OC or STS format and transmit them to the matrix 606.

The OC-X/STS-X interface 610 is operational to receive ATM cells from the matrix 606 and to transmit the ATM cells over a connection to the communication device 616.

The OC-X/STS-X interface 610 also may receive ATM cells in the OC or STS format and transmit them to the matrix 606.

Call signaling may be received through and transferred from the OC-M/STS-M interface 608. Also, call signaling may be received through and transferred from the OC-X/STS-X interface 610. The call signaling may be connected on a connection or transmitted to the control interface directly or via the matrix 606.

The signaling processor 612 is configured to send control messages to the CAM 602 to implement particular features on particular VP/VC circuits. Alternatively, lookup tables may be used to implement particular features for particular VP/VCs.

Figure 7:
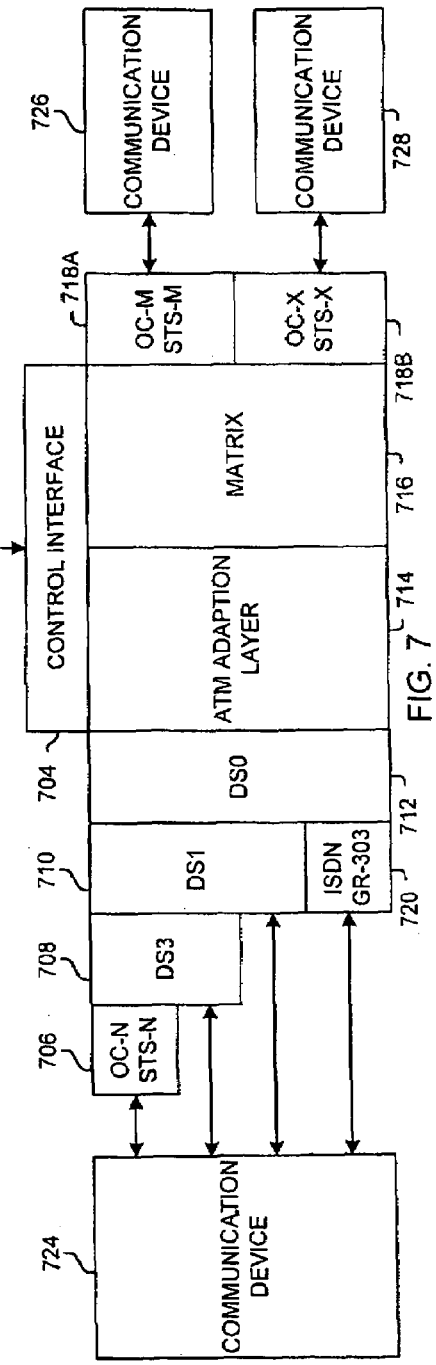
FIG. 7 is a functional diagram of a controllable asynchronous transfer mode matrix with time division multiplex capability in accordance with the present invention.

FIG. 7 illustrates another exemplary embodiment of a CAM which has time division multiplex (TDM) capability, but other CAMs that support the requirements of the invention also are applicable. The CAM 702 may receive and transmit in-band and out-of-band signaled calls.

The CAM 702 preferably has a control interface 704, an OC-N/STS-N interface 706, a digital signal level 3 (DS3) interface 708, a DS1 interface 710, a DS0 interface 712, an ATM adaptation layer (AAL) 714, a controllable ATM matrix 716, an OC-M/STS-M interface 718A, an OC-X/STS-X interface 718B, and an ISDN/GR-303 interface 720. As used herein in conjunction with OC or STS, "N" refers to an integer, "M" refers to an integer, and "X" refers to an integer.

The control interface 704 receives control messages originating from the signaling processor 722, identifies DS0 and virtual connection assignments in the control messages, and provides these assignments to the AAL 714 or the matrix 716 for implementation. The control messages may be received over an ATM virtual connection and through the OC-M/STS-M interface 718A to the control interface 704, through the OC-X/STS-X interface 718B and the matrix 716 to the control interface, or directly through the control interface from a link.

The OC-N/STS-N interface 706, the DS3 interface 708, the DS1 interface 710, the DS0 interface 712, and the ISDN/GR-303 interface 720 each can receive user communications from a communication device 724. Likewise, the OC-M/STS-M interface 718A and the OC-X/STS-X interface 718B can receive user communications from the communication devices 726 and 728.

The OC-N/STS-N interface 706 receives OC-N formatted user communications and STS-N formatted user communications and converts the user communications to the DS3 format. The DS3 interface 708 receives user communications in the DS3 format and converts the user communications to the DS1 format. The DS3 interface 708 can receive DS3s from the OC-N/STS-N interface 706 or from an external connection. The DS1 interface 710 receives the user communications in the DS1 format and converts the user communications to the DS0 format. The DS1 interface 710 receives DS1s from the DS3 interface 708 or from an external connection. The DS0 interface 712 receives user communications in the DS0 format and provides an interface to the AAL 714. The ISDN/GR-303 interface 720 receives user communications in either the ISDN format or the GR-303 format and converts the user communications to the DS0 format. In addition, each interface may transmit user communications in like manner to the communication device 724.

The OC-M/STS-M interface 718A is operational to receive ATM cells from the AAL 714 or from the matrix 716 and to transmit the ATM cells over a connection to the communication device 726. The OC-M/STS-M interface 718A also may receive ATM cells in the OC or STS format and transmit them to the AAL 714 or to the matrix 716.

The OC-X/STS-X interface 718B is operational to receive ATM cells from the AAL 714 or from the matrix 716 and to transmit the ATM cells over a connection to the communication device 728. The OC-X/STS-X interface 718B also may receive ATM cells in the OC or STS format and transmit them to the AAL 714 or to the matrix 716.

Call signaling may be received through and transferred from the OC-N/STS-N interface 706 and the ISDN/GR-303 interface 720. Also, call signaling may be received through and transferred from the OC-M/STS-M interface 718A and the OC-X/STS-X interface 718B. The call signaling may be connected on a connection or transmitted to the control interface directly or via an interface as explained above.

The AAL 714 comprises both a convergence sublayer and a segmentation and reassembly (SAR) sublayer. The AAL 714 obtains the identity of the DS0 and the ATM VP/VC from the control interface 704. The AAL 714 is operational to convert between the DS0 format and the ATM format. AALs are known in the art, and information about AALs is provided by International Telecommunications Union (ITU) documents in the series of 1.363, which are incorporated herein by reference. For example, ITU document 1.363.1 discusses AAL1. An AAL for voice calls is described in U.S. Pat. No. 5,806,553 entitled "Cell Processing for Voice Transmission," which is incorporated herein by reference.

Calls with multiple 64 Kilo-bits per second (Kbps) DS0s are known as N×64 calls. If desired, the AAL 714 can be configured to accept control messages through the control interface 704 for N×64 calls. The CAM 702 is able to interwork, multiplex, and demultiplex for multiple DS0s. A technique for processing VP/VCs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

The matrix 716 is a controllable ATM matrix that provides cross connect functionality in response to control messages from the signaling processor 722. The matrix 716 has access to VP/VCs over which it can connect calls. For example, a call can come in over a VP/VC through the OC-M/STS-M interface 718A and be connected through the matrix 716 over a VP/VC through the OC-X/STS-X interface 718B in response to a control message received by the signaling processor 722 through the control interface 704. Alternately, the matrix 716 may transmit a call received over a VP/VC through the OC-M/STS-M interface 718A to the AAL 714 in response to a control message received by the signaling processor 722 through the control interface 704. Communications also may occur in opposite directions through the various interfaces.

In some embodiments, it may be desirable to incorporate digital signal processing capabilities at, for example, the DS0 level. It also may be desired to apply echo control to selected DS0 circuits. In these embodiments, a signal processor may be included. The signaling processor 722 is configured to send control messages to the CAM 702 to implement particular features on particular DS0 or VP/VC circuits. Alternatively, lookup tables may be used to implement particular features for particular circuits or VP/VCs.

It will be appreciated from the teachings above for the CAMs and for the teachings below for the ATM interworking units, that the above described CAMs can be adapted for modification to transmit and receive other formatted communications such as synchronous transport module (STM) and European level (E) communications. For example, the OC/STS, DS3, DS1, DS0, and ISDN/GR-303 interfaces can be replaced by STM electrical/optical (E/O), E3, E1, E0, and digital private network signaling system (DPNSS) interfaces, respectively.

The ATM Interworking Unit

FIG. 8 illustrates an exemplary embodiment of an interworking unit which is an ATM interworking unit 802 suitable for the present invention for use with a SONET system. Other interworking units that support the requirements of the invention also are applicable. The ATM interworking unit 802 may receive and transmit in-band and out-of-band calls.

The ATM interworking unit 802 preferably has a control interface 804, an OC-N/STS-N interface 806, a DS3 interface 808, a DS1 interface 810, a DS0 interface 812, a signal processor 814, an AAL 816, an OC-M/STS-M interface 818, and an ISDN/GR-303 interface 820. As used herein in conjunction with OC or STS, "N" refers to an integer, and "M" refers to an integer.

The control interface 804 receives control messages originating from the signaling processor 822, identifies DS0 and virtual connection assignments in the control messages, and provides these assignments to the AAL 816 for implementation. The control messages are received over an ATM virtual connection and through the OC-M/STS-M interface 818 to the control interface 804 or directly through the control interface from a link.

The OC-N/STS-N interface 806, the DS3 interface 808, the DS1 interface 810, the DS0 interface 812, and the ISDN/GR-303 interface 820 each can receive user communications from a communication device 824. Likewise, the OC-M/STS-M interface 818 can receive user communications from a communication device 826.

The OC-N/STS-N interface 806 receives OC-N formatted user communications and STS-N formatted user communications and demultiplexes the user communications to the DS3 format. The DS3 interface 808 receives user communications in the DS3 format and demultiplexes the user communications to the DS1 format. The DS3 interface 808 can receive DS3s from the OC-N/STS-N interface 806 or from an external connection. The DS1 interface 810 receives the user communications in the DS1 format and demultiplexes the user communications to the DS0 format. The DS1 interface 810 receives DS1s from the DS3 interface 808 or from an external connection. The DS0 interface 812 receives user communications in the DS0 format and provides an interface to the AAL 816. The ISDN/GR-303 interface 820 receives user communications in either the ISDN format or the GR-303 format and converts the user communications to the DS0 format. In addition, each interface may transmit user communications in like manner to the communication device 824.

The OC-M/STS-M interface 818 is operational to receive ATM cells from the AAL 816 and to transmit the ATM cells over the connection to the communication device 826. The OC-M/STS-M interface 818 also may receive ATM cells in the OC or STS format and transmit them to the AAL 816.

Call signaling may be received through and transferred from the OC-N/STS-N interface 806 and the ISDN/GR-303 interface 820. Also, call signaling may be received through and transferred from the OC-M/STS-M interface 818. The call signaling may be connected on a connection or transmitted to the control interface directly or via another interface as explained above.

The AAL 816 comprises both a convergence sublayer and a segmentation and reassembly (SAR) sublayer. The AAL 816 obtains the identity of the DS0 and the ATM VP/VC from the control interface 804. The AAL 816 is operational to convert between the DS0 format and the ATM format.

If desired, the AAL 816 can be configured to accept control messages through the control interface 804 for N×64 calls. The ATM interworking unit 802 is able to interwork, multiplex, and demultiplex for multiple DS0s.

DS0 connections are bi-directional and ATM connections are typically unidirectional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

In some embodiments, it may be desirable to incorporate digital signal processing capabilities at the DS0 level. It may also be desired to apply echo control to selected DS0 circuits. In these embodiments, a signal processor 814 is included either separately (as shown) or as a part of the DS0 interface 812. The signaling processor 822 is configured to send control messages to the ATM interworking unit 802 to implement particular features on particular DS0 circuits. Alternatively, lookup tables may be used to implement particular features for particular circuits or VP/VCs.

FIG. 9 illustrates another exemplary embodiment of an interworking unit which is an ATM interworking unit 902 suitable for the present invention for use with an SDH system. The ATM interworking unit 902 preferably has a control interface 904, an STM-N electrical/optical (E/O) interface 906, an E3 interface 908, an E1 interface 910, an E0 interface 912, a signal processor 914, an AAL 916, an STM-M electrical/optical (E/O) interface 918, and a DPNSS interface 920. As used herein in conjunction with STM, "N" refers to an integer, and "M" refers to an integer.

The control interface 904 receives control messages from the signaling processor 922, identifies E0 and virtual connection assignments in the control messages, and provides these assignments to the AAL 916 for implementation. The control messages are received over an ATM virtual connection and through the STM-M interface 918 to the control interface 804 or directly through the control interface from a link.

The STM-N E/O interface 906, the E3 interface 908, the E1 interface 910, the E0 interface 912, and the DPNSS interface 920 each can receive user communications from a second communication device 924. Likewise, the STM-M E/O interface 918 can receive user communications from a third communication device 926.

The STM-N E/O interface 906 receives STM-N electrical or optical formatted user communications and converts the user communications from the STM-N electrical or STM-N optical format to the E3 format. The E3 interface 908 receives user communications in the E3 format and demultiplexes the user communications to the E1 format. The E3 interface 908 can receive E3s from the STM-N E/O interface 906 or from an external connection. The E1 interface 910 receives the user communications in the E1 format and demultiplexes the user communications to the E0 format. The E1 interface 910 receives E1s from the STM-N E/O interface 906 or the E3 interface 908 or from an external connection. The E0 interface 912 receives user communications in the E0 format and provides an interface to the AAL 916. The DPNSS interface 920 receives user communications in the DPNSS format and converts the user communications to the E0 format. In addition, each interface may transmit user communications in a like manner to the communication device 924.

The STM-M E/O interface 918 is operational to receive ATM cells from the AAL 916 and to transmit the ATM cells over the connection to the communication device 926. The STM-M E/O interface 918 may also receive ATM cells in the STM-M E/O format and transmit them to the AAL 916.

Call signaling may be received through and transferred from the STM-N E/O interface 906 and the DPNSS interface 920. Also, call signaling may be received through and transferred from the STM-M E/O interface 918. The call signaling may be connected on a connection or transmitted to the control interface directly or via another interface as explained above.

The AAL 916 comprises both a convergence sublayer and a segmentation and reassembly (SAR) sublayer. The AAL obtains the identity of the E0 and the ATM VP/VC from the control interface 904. The AAL 916 is operational to convert between the E0 format and the ATM format, either in response to a control instruction or without a control instruction. AAL's are known in the art. If desired, the AAL 916 can be configured to receive control messages through the control interface 904 for N×64 user communications.

E0 connections are bi-directional and ATM connections typically are uni-directional. As a result, two virtual connections in opposing directions typically will be required for each E0. Those skilled in the art will appreciate how this can be accomplished in the context of the invention.

In some instances, it may be desirable to incorporate digital signal processing capabilities at the E0 level. Also, it may be desirable to apply echo control. In these embodiments, a signal processor 914 is included either separately (as shown) or as a part of the E0 interface 912. The signaling processor 922 is configured to send control messages to the ATM interworking unit 902 to implement particular features on particular circuits. Alternatively, lookup tables may be used to implement particular features for particular circuits or VP/VCs.

The Signaling Processor

The signaling processor receives and processes telecommunications call signaling, control messages, and customer data to select connections that establish communication paths for calls. In the preferred embodiment, the signaling processor processes SS7 signaling to select connections for a call. An example of call processing in a call processor and the associated maintenance that is performed for call processing is described in a U.S. patent application Ser. No. 09/026,766 entitled "System and Method for Treating a Call for Call Processing," which is incorporated herein by reference.

In addition to selecting connections, the signaling processor performs many other functions in the context of call processing. It not only can control routing and select the actual connections, but it also can validate callers, control echo cancellers, generate accounting information, invoke intelligent network functions, access remote databases, manage traffic, and balance network loads. One skilled in the art will appreciate how the signaling processor described below can be adapted to operate in the above embodiments.

Figure 10:
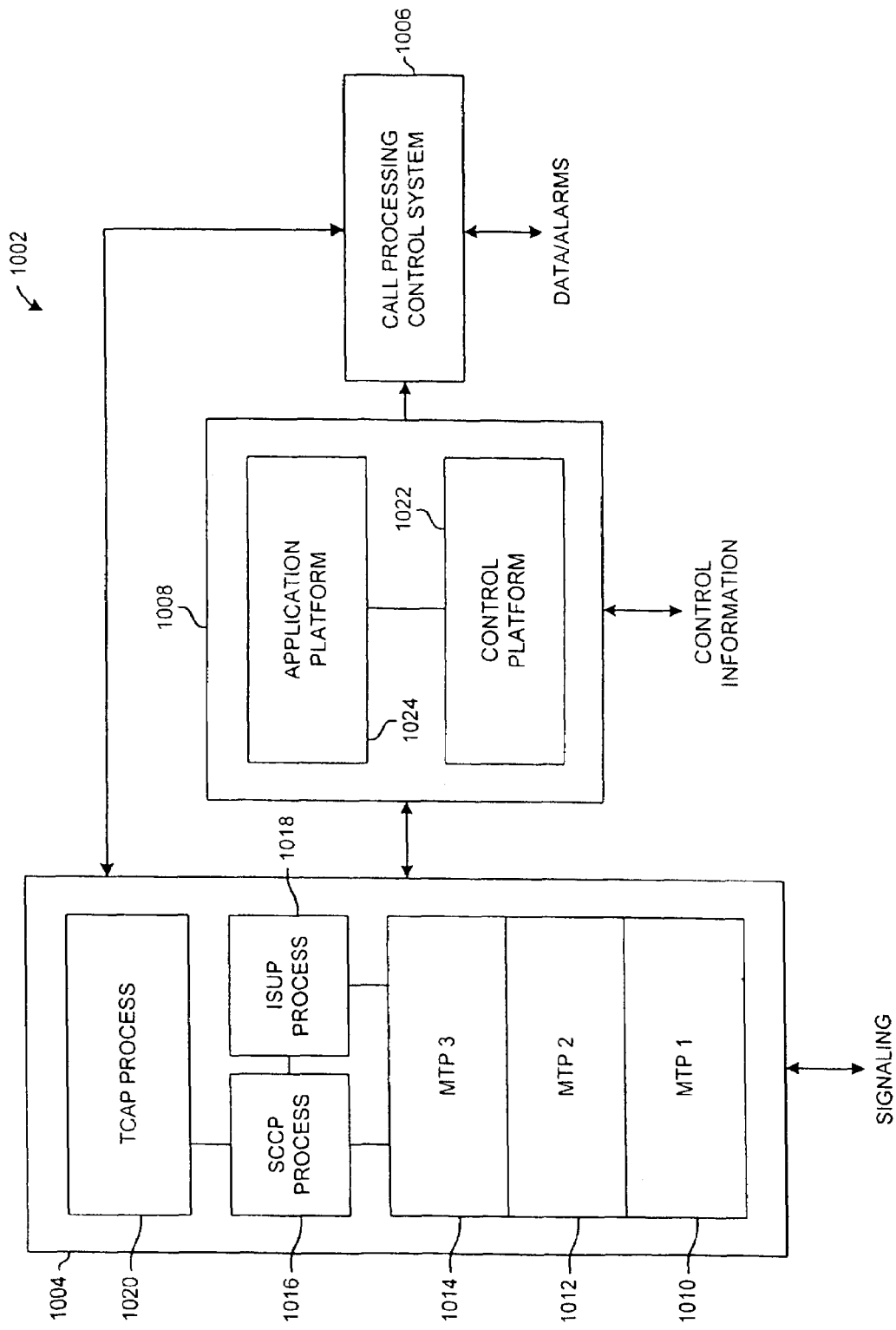
FIG. 10 is a block diagram of a signaling processor constructed in accordance with the present system.

FIG. 10 depicts an embodiment of a signaling processor. Other versions also are contemplated. In the embodiment of FIG. 10, the signaling processor 1002 has a signaling interface 1004, a call processing control system 1006 (CPCS), and a call processor 1008. It will be appreciated that the signaling processor 1002 may be constructed as modules in a single unit or as multiple units.

The signaling interface 1004 is coupled externally to signaling systems—preferably to signaling systems having a message transfer part (MTP), an ISDN user part (ISUP), a signaling connection control part (SCCP), an intelligent network application part (INAP), and a transaction capabilities application part (TCAP). The signaling interface 1004 preferably is a platform that comprises an MTP level 1 1010, an MTP level 2 1012, an MTP level 3 1014, an SCCP process 1016, an ISUP process 1018, and a TCAP process 1020. The signaling interface 1004 also has INAP functionality.

The signaling interface 1004 may be linked to a communication device (not shown). For example, the communication device may be an SCP which is queried by the signaling interface with a TCAP query to obtain additional call-associated data. The answer message may have additional information parameters that are required to complete call processing. The communication device also may be an STP or other device.

The signaling interface 1004 is operational to transmit, process, and receive call signaling. The TCAP, SCCP, ISUP, and INAP functionality use the services of the MTP to transmit and receive the messages. Preferably, the signaling interface 1004 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGM&S company).

The processes of the signaling interface 1004 process information that is received in message signal units (MSUs) and convert the information to call information elements that are sent to the call processor 1008 to be processed. A call information element may be, for example, an ISUP IAM message parameter from the MSU. The signaling interface 1004 strips the unneeded header information from the MSU to isolate the message information parameters and passes the parameters to the call processor 1008 as the call information elements. Examples of these parameters are the called number, the calling number, and user service information. Other examples of messages with information elements are an ANM, an ACM, a REL, an RLC, and an INF. In addition, call information elements are transferred from the call processor 1008 back to the signaling interface 1004, and the information elements are reassembled into MSUs and transferred to a signaling point.

The CPCS 1006 is the above-described management and administration system. As described above, the CPCS 1006 is the user interface and external systems interface into the call processor 1008. The CPCS 1006 serves as a collection point for call-associated data such as logs, operational measurement data, statistical information, accounting information, and other call data. The CPCS 1006 can configure the call-associated data and/or transmit it to reporting centers.

The CPCS 1006 accepts data, such as the translations, from a source such as an operations system and updates the data in the tables in the call processor 1008. The CPCS 1006 ensures that this data is in the correct format prior to transferring the data to the call processor 1008. The CPCS 1006 also provides configuration data to other devices including the call processor 1008, the signaling interface 1004, the interworking unit (not shown), and the controllable ATM matrix (not shown). In addition, the CPCS 1006 provides for remote control of call monitoring and call tapping applications from the call processor 1008.

The CPCS 1006 also serves as a collection point for alarms. Alarm information is transferred to the CPCS 1006. The CPCS 1006 then transports alarm messages to the required communication device. For example, the CPCS 1006 can transport alarms to an operations center.

The CPCS 1006 also has a human-machine interface (HMI). This allows a person to log onto the CPCS 1006 and manage data tables or review data tables in the CPCS or provide maintenance services.

The call processor 1008 processes call signaling and controls an ATM interworking unit, such as an ATM interworking multiplexer (mux) that performs interworking of DS0s and VP/VCs, and an ATM matrix. However, the call processor 1008 may control other communications devices and connections in other embodiments.

The call processor 1008 comprises a control platform 1022 and an application platform 1024. Each platform 1022 and 1024 is coupled to the other platform.

The control platform 1022 is comprised of various external interfaces including an interworking unit interface, a controllable ATM matrix, an echo interface, a resource control interface, a call information interface, and an operations interface. The control platform 1022 is externally coupled to an interworking unit control, a controllable ATM matrix control, an echo control, a resource control, accounting, and operations. The interworking unit interface exchanges messages with at least one interworking unit. These messages comprise DS0 to VP/VC assignments, acknowledgments, and status information. The controllable ATM matrix interface exchanges messages with at least one controllable ATM matrix. These messages comprise DS0 to VP/VC assignments, VP/VC to VP/VC assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The call information interface transfers pertinent call information to a call information processing system, such as to the CPCS 1006. Typical call information includes accounting information, such as the parties to the call, time points for the call, and any special features applied to the call. One skilled in the art will appreciate how to produce the software for the interfaces in the control platform 1022.

The application platform 1024 processes signaling information from the signaling interface 1004 to select connections. The identity of the selected connections are provided to the control platform 1022 for the interworking unit interface and/or for the controllable ATM matrix interface.

The application platform 1024 is responsible for validation, translation, routing, call control, exceptions, screening, and error handling. In addition to providing the control requirements for the interworking unit and the controllable ATM matrix, the application platform 1024 also provides requirements for echo control and resource control to the appropriate interface of the control platform 1022. In addition, the application platform 1024 generates signaling information for transmission by the signaling interface 1004. The signaling information might be for ISUP, INAP, or TCAP messages to external network elements. Pertinent information for each call is stored in an enhanced circuit data block (ECDB) for the call. The ECDB can be used for tracking and accounting the call.

The application platform 1024 preferably operates in general accord with the Basic Call State Model (BCSM) defined by the ITU. An instance of the BCSM is created to handle each call. The BCSM includes an originating process and a terminating process. The application platform 1024 includes a service switching function (SSF) that is used to invoke the service control function (SCF). Typically, the SCF is contained in an SCP. The SCF is queried with ICAP or RNAP messages that are transported by the signaling interface 1004 and which are initiated with information from the SSF in the application platform 1024. The originating or terminating processes will access remote databases with intelligent network (IN) functionality via the SSF.

Software requirements for the application platform 1024 can be produced in specification and description language (SDL) defined in ITU-T Z. 100 or similar logic or description languages. The SDL can be converted into C code. A real time case tool such as SDT from Telelogic, Inc. or Object Time from Object Time, Inc. can be used. Additional C and C++ code can be added as required to establish the environment. It will be appreciated that other software languages and tools may be used.

The call processor 1008 can be comprised of the above-described software loaded onto a computer. The computer can be a generally available fault-tolerant Unix computer, such as those provided by Sun, Tandem, or Hewlett Packard. It may be desirable to utilize the multi-threading capability of a Unix operating system.

From FIG. 10, it can be seen that the application platform 1024 processes signaling information to control numerous systems and facilitate call connections and services. The SS7 signaling is exchanged between the call processor 1008 and external components through the signaling interface 1004, and control information is exchanged with external systems through the control platform 1022. Advantageously, the signaling interface 1004, the CPCS 1006, and the call processor 1008 are not integrated into a switch central processing unit (CPU) that is coupled to a switching matrix. Unlike an SCP, the components of the signaling processor 1002 are capable of processing ISUP messages independently of TCAP queries.

SS7 Message Designations

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query Message
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address Message
LPA—Loop Back Acknowledgment
PAM—Pass Along Message
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

Call Processor Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 11:
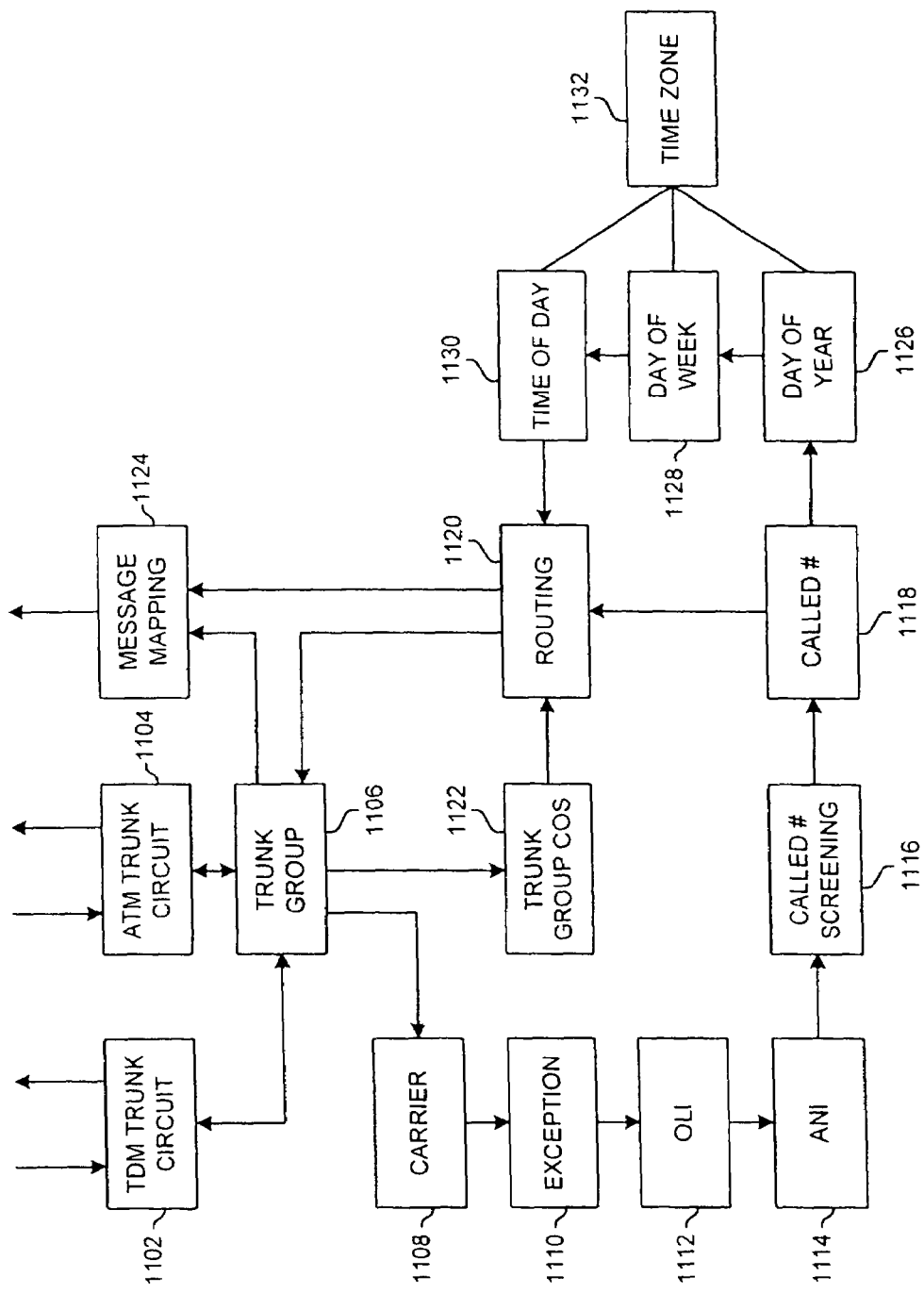
FIG. 11 is a block diagram of a data structure having tables that are used in the signaling processor of FIG. 13.

FIG. 11 depicts an exemplary data structure preferably used by the call processor 1002 of FIG. 10 to execute the BCSM. This is accomplished through a series of tables that point to one another in various ways. The pointers typically are comprised of next function and next label designations. The next function points to the next table, and the next label points to an entry or a range of entries in that table. It will be appreciated that the pointers for the main call processing are illustrated in FIG. 11.

The primary data structure has a TDM trunk circuit table 1102, an ATM trunk circuit table 1104, a trunk group table 1106, a carrier table 1108, an exception table 1110, an originating line information (OLI) table 1112, an automatic number identification (ANI) table 1114, a called number screening table 1116, a called number table 1118, a routing table 1120, a trunk group class of service (COS) table 1122, and a message mapping table 1124. Also included in the data structure are a day of year table 1126, a day of week table 1128, a time of day table 1130, and a time zone table 1132.

The TDM trunk circuit table 1102 contains information required to provision the TDM side of a connection from the call processor site. Each circuit on the TDM side of a connection has an entry. The TDM trunk circuit table 1102 is accessed from the trunk group table 1106 or an external call process, and it points to the trunk group table.

The ATM trunk circuit table 1104 contains information required to provision the ATM side of a connection. Typically, one record appears in this table per ATM trunk group. Although, the system can be configured alternately for multiple records per trunk group. The ATM trunk circuit table 1104 is accessed from the trunk group table 1106 or an external call process, and it points to the trunk group table.

The trunk group table 1106 contains information that is required to build trunk groups out of different trunk members identified in the TDM and ATM trunk circuit tables 1102 and 1104. The trunk group table 1106 contains information related to the originating and terminating trunk groups. The trunk group table 1106 typically points to the carrier table 1108. Although, the trunk group table 1106 may point to the exception table 1110, the OLI table 1112, the ANI table 1114, the called number screening table 1116, the called number table 1118, the routing table 1120, the day of year table 1126, the day of week table 1128, the time of day table 1130, and the treatment table (see FIG. 12).

For default processing of an IAM of an outgoing call in the forward direction, when the call process determines call setup and routing parameters for user communications on the originating portion, the trunk group table 1106 is the next table after the TDM and ATM trunk circuit tables 1102 and 1104, and the trunk group table points to the carrier table 1108. For default processing of an IAM of an outgoing call in the forward direction, when the call process determines call setup and routing parameters for user communications on the terminating portion, the trunk group table 1106 is the next table after the routing table 1120, and the trunk group table points to the TDM or ATM trunk circuit table 1102 or 1104. For default processing of an ACM or an ANM of an outgoing call in the originating direction, when the call process determines parameters for signaling, the trunk group table 1106 is the next table after the TDM or ATM trunk circuit table 1102 or 1104, and the trunk group table points to the message mapping table 1124. It will be appreciated that this is the default method, and, as explained herein, other implementations of table processing occur.

The carrier table 1108 contains information that allows calls to be screened based, at least in part, on the carrier information parameter and the carrier selection parameter. The carrier table 1108 typically points to the exception table 1110. Although, the carrier table 1108 may point to the OLI table 1112, the ANI table 1114, the called number screening table 1116, the called number table 1118, the routing table 1120, the day of year table 1126, the day of week table 1128, the time of day table 1130, the treatment table (see FIG. 12), and the database services table (see FIG. 13).

The exception table 1110 is used to identify various exception conditions related to the call that may influence the routing or handling of the call. The exception table 1110 contains information that allows calls to be screened based, at least in part, on the called party number and the calling party's category. The exception table 1110 typically points to the OLI table 1112. Although, the exception table 1110 can point to the ANI table 1114, the called number screening table 1116, the called number table 1118, the routing table 1120, the day of year table 1126, the day of week table 1128, the time of day table 1130, the call rate table, the percent control table, the treatment table (see FIG. 12), and the database services table (see FIG. 13).

The OLI table 1112 contains information that allows calls to be screened based, at least in part, on originating line information in an IAM. The OLI table 1112 typically points to the ANI table 1114. Although, the OLI table can point to the called number screening table 1116, the called number table 1118, the routing table 1120, the day of year table 1126, the day of week table 1128, the time of day table 1130, and the treatment table (see FIG. 12).

The ANI table 1114 is used to identify any special characteristics related to the caller's number, which is commonly known as automatic number identification. The ANI table 1114 is used to screen and validate an incoming ANI. ANI specific requirements such as queuing, echo cancellation, time zone, and treatments can be established. The ANI table 1114 typically points to the called number screening table 1116. Although, the ANI table 1114 can point to the called number table 1118, the routing table 1120, the day of year table 1126, the day of week table 1128, the time of day table 1130, and the treatment table (see FIG. 12).

The called number screening table 1116 is used to screen called numbers. The called number screening table 1116 determines the disposition of the called number and the nature of the called number. The called number screening table 1116 is used to provide the trigger detection point (TDP) for an AIN SCP TCAP query. It is used, for example, with the local number portability (LNP) feature. The called number screening table can invoke a TCAP. The called number screening table 1116 typically points to the called number table 1118. Although, the called number screening table 1116 can point to the routing table 1120, the treatment table, the call rate table, the percent table (see FIG. 12), and the database services table (see FIG. 13).

The called number table 1118 is used to identify routing requirements based on, for example, the called number. This will be the case for standard calls. The called number table 1118 typically points to the routing table 1110. In addition, the called number table 1126 can be configured to alternately point to the day of year table 1126. The called number table 1118 can also point to the treatment table (see FIG. 12) and the database services table (see FIG. 13).

The routing table 1120 contains information relating to the routing of a call for various connections. The routing table 1120 typically points to the treatment table (see FIG. 12). Although, the routing table also can point to the trunk group table 1106 and the database services table (see FIG. 13).

For default processing of an IAM of an outgoing call in the forward direction, when the call process determines call setup and routing parameters for user communications, the routing table 1120 is the next table after the called number table 1118, and the routing table points to the trunk group table 1106. For default processing of an IAM of an outgoing call in the forward direction, when the call process determines parameters for signaling, the routing table 1120 is the next table after the called number table 1118, and the routing table points to the message mapping table 1124. It will be appreciated that this is the default method, and, as explained herein, other implementations of table processing occur.

The trunk group COS table 1122 contains information that allows calls to be routed differently based on the class of service assigned to the originating trunk group and to the terminating trunk group. The trunk group COS table can point to the routing table 1120 or the treatment table (see FIG. 12).

When the trunk group COS table 1122 is used in processing, after the routing table 1120 and the trunk group table 1106 are processed, the trunk group table points to the trunk group COS table. The trunk group COS table points back to the routing table 1120 for further processing. Processing then continues with the routing table 1120 which points to the trunk group table 1106, and the trunk group table which points to the TDM or ATM trunk circuit table 1102 or 1104. It will be appreciated that this is the default method, and, as explained herein, other implementations of table processing occur.

The message mapping table 1124 is used to provide instructions for the formatting of signaling messages from the call processor. It typically can be accessed by the routing table 1120 or the trunk group table 1106 and typically determines the format of the outgoing messages leaving the call processor.

The day of year table 1126 contains information that allows calls to be routed differently based on the day of the year. The day of year table typically points to the routing table 1120 and references the time zone table 1132 for information. The day of year table 1126 also can point to the called number screening table 1116, the called number table 1118, the routing table 1120, the day of week table 1128, the time of day table 1130, and the treatment table (see FIG. 12).

The day of week table 1128 contains information that allows calls to be routed differently based on the day of the week. The day of week table typically points to the routing table 1120 and references the time zone table 1132 for information. The day of week table 1128 also can point to the called number screening table 1116, the called number table 1118, the time of day table 1130, and the treatment table (see FIG. 12).

The time of day table 1130 contains information that allows calls to be routed differently based on the time of the day. The time of day table 1130 typically points to the routing table 1120 and references the time zone table 1132 for information. The time of day table 1130 also can point to the called number screening table 1116, the called number table 1118, and the treatment table (see FIG. 12).

The time zone table 1132 contains information that allows call processing to determine if the time associated with the call processing should be offset based on the time zone or daylight savings time. The time zone table 1132 is referenced by, and provides information to, the day of year table 1126, the day of week table 1128, and the time of day table 1130.

Figure 12:
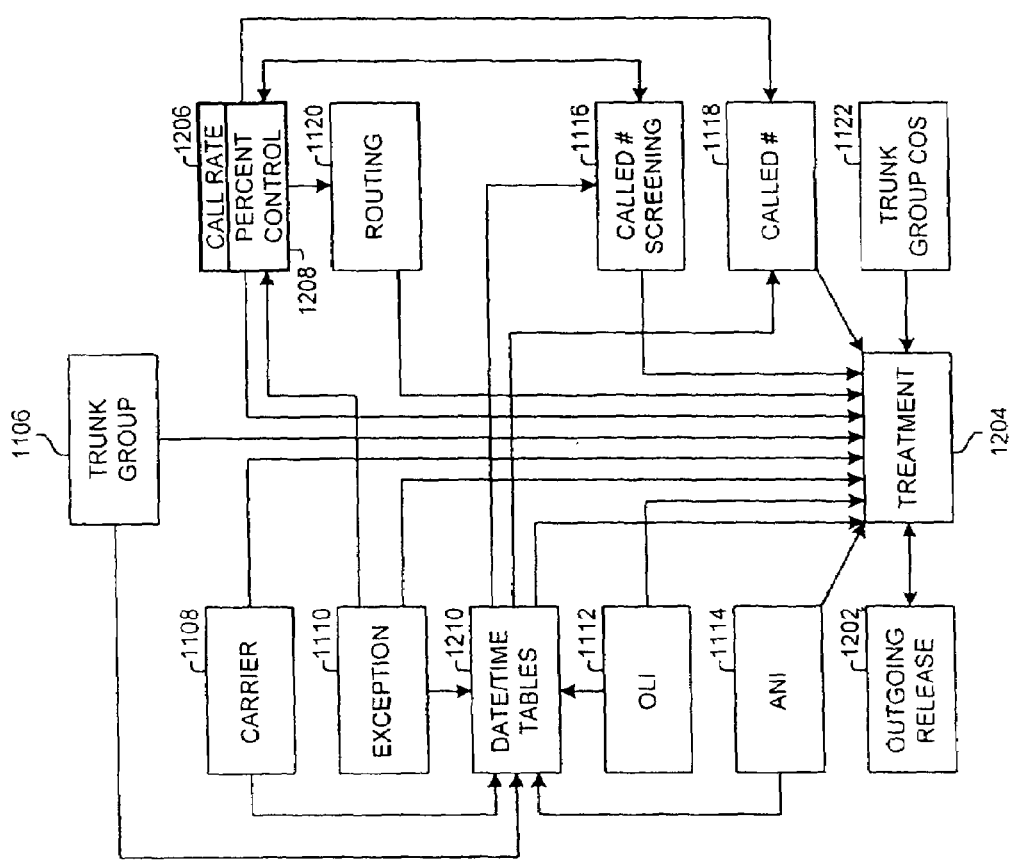
FIG. 12 is a block diagram of additional tables that are used in the signaling processor of FIG. 11.

FIG. 12 is an overlay of FIG. 11. The tables from FIG. 11 are present. However, for clarity, the table's pointers have been omitted, and some tables have not been duplicated in FIG. 12. FIG. 12 illustrates additional tables that can be accessed from the tables of FIG. 11. These include an outgoing release table 1202, a treatment table 1204, a call rate table 1206, and a percent control table 1208, and time/date tables 1210.

The outgoing release table 1202 contains information that allows call processing to determine how an outgoing release message is to be formatted. The outgoing release table 1202 typically points to the treatment table 1206.

The treatment table 1204 identifies various special actions to be taken in the course of call processing. For example, based on the incoming trunk group or ANI, different treatments or cause codes are used to convey problems to the called and calling parties. This typically will result in the transmission of a release message (REL) and a cause value. The treatment table 1204 typically points to the outgoing release table 1202 and the database services table (see FIG. 13).

The call rate table 1206 contains information that is used to control call attempts on an attempt per second basis. Preferably, attempts from 100 per second to 1 per minute are programmable. The call rate table 1206 typically points to the called number screening table 1116, the called number table 1118, the routing table 1120, and the treatment table 1204.

The percent control table 1208 contains information that is used to control call attempts based upon a percent value of the traffic that is processed through call processing. The percent control table 1208 typically points to the called number screening table 1116, the called number table 1118, the routing table 1120, and the treatment table 1204.

The date/time tables 1210 have been identified in FIG. 11 as the day of year table 1126, the day of week table 1128, the time of day table 1126, and the time zone table 1132. They are illustrated in FIG. 12 as a single location for ease and clarity but need not be so located.

Figure 13:
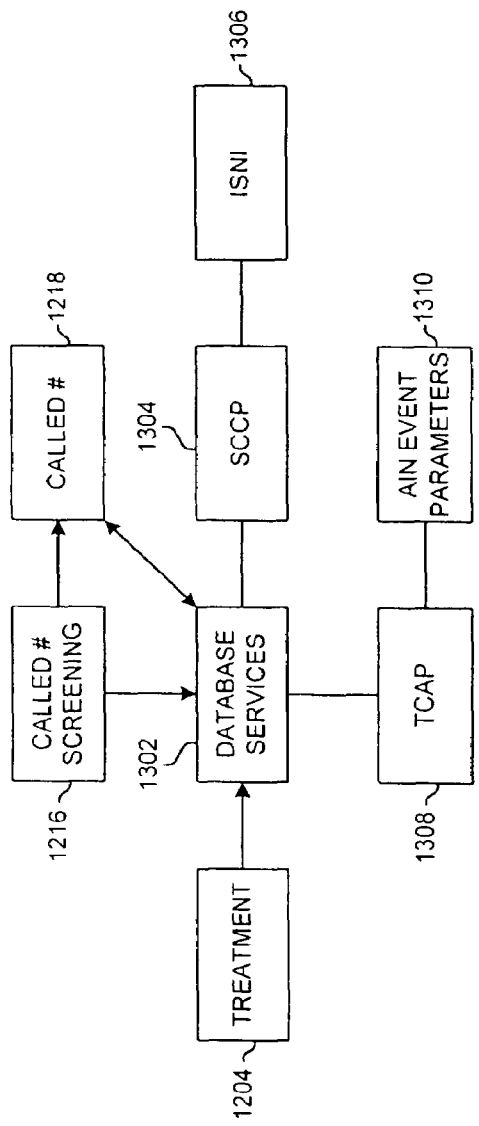
FIG. 13 is a block diagram of additional tables that are used in the signaling processor of FIG. 11.

FIG. 13 is an overlay of FIGS. 11-12. The tables from FIGS. 11-12 are present. However, for clarity, the table's pointers have been omitted, and some tables have not been duplicated in FIG. 13.

FIG. 13 illustrates additional tables that can be accessed from the tables of FIGS. 11-12 and which are directed to the TCAP and the SCCP message processes. These include a database services table 1302, a signaling connection control part (SCCP) table 1304, an intermediate signaling network identification (ISNI) table 1306, a transaction capabilities application part (TCAP) table 1308, and an advanced intelligent network (AIN) event parameters table 1310.

The database services table 1302 contains information about the type of database service requested by call processing. The database services table 1302 references and obtains information from the SCCP table 1304 and the TCAP table 1308. After the database function is performed, the call is returned to normal call processing. The database services table 1302 points to the called number table 1118.

The SCCP table 1304 contains information and parameters required to build an SCCP message. The SCCP table 1304 is referenced by the database services table 1302 and provides information to the database services table.

The ISNI table 1306 contains network information that is used for routing SCCP message to a destination node. The ISNI table 1306 is referenced by the SCCP table 1304 and provides information to the SCCP table.

The TCAP table 1308 contains information and parameters required to build a TCAP message. The TCAP table 1308 is referenced by the database services table 1302 and provides information to the database services table.

The AIN event parameters table 1310 contains information and parameters that are included in the parameters portion of a TCAP event message. The AIN event parameters table 1310 is referenced by the TCAP table 1308 and provides information to the TCAP table.

Figure 14:
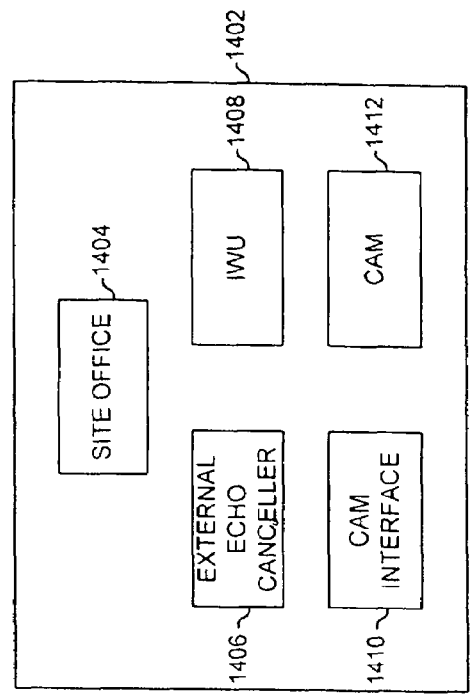
FIG. 14 is a block diagram of additional tables that are used in the signaling processor of FIG. 11.

FIG. 14 is an overlay of FIGS. 11-13. The tables from FIGS. 11-13 are present. However, for clarity, the tables have not been duplicated in FIG. 14. FIG. 14 illustrates additional tables that can be used to setup the call process so that the tables of FIGS. 11-13 may be used. These setup tables 1402 include a site office table 1404, an external echo canceller table 1406, an interworking unit (IWU) table 1408, a controllable ATM matrix (CAM) interface table 1410, and a controllable ATM matrix (CAM) table 1412.

The site office table 1404 contains information which lists office-wide parameters, some of which are information-based and others which affect call processing. The site office table 1404 provides information to the call processor or switch during initialization or other setup procedures, such as population of data or transfer of information to one or more memory locations for use during call processing.

The external echo canceller 1406 contains information that provides the interface identifier and the echo canceller type when an external echo canceller is required. The external echo canceller table 1406 provides information to the call processor or switch during initialization or other setup procedures, such as population of data or transfer of information to one or more memory locations for use during call processing.

The IWU table 1408 contains the internet protocol (IP) identification numbers for interfaces to the interworking units at the call processor or switch site. The IWU table 1408 provides information to the call processor or switch during initialization or other setup procedures, such as population of data or transfer of information to one or more memory locations for use during call processing.

The CAM interface table 1410 contains information for the logical interfaces associated with the CAM. The CAM interface table 1410 provides information to the call processor or switch during initialization or other setup procedures, such as population of data or transfer of information to one or more memory locations for use during call processing.

The CAM table 1412 contains information associated with the logical and physical setup properties of the CAM. The CAM table 1412 provides information to the call processor or switch during initialization or other setup procedures, such as population of data or transfer of information to one or more memory locations for use during call processing.

FIGS. 15-44 depict examples of the various tables described above. It will be appreciated that other versions of tables may be used. In addition, information from the identified tables may be combined or changed to form different tables.

FIG. 15 depicts an example of a TDM trunk circuit table. The TDM trunk circuit table is used to access information about the originating circuit for originating circuit call processing. It also is used to provide information about the terminating circuit for terminating circuit call processing. The trunk group number of the circuit associated with the call is used to enter the table. The group member is the second entry that is used as a key to identify or fill information in the table. The group member identifies the member number of the trunk group to which the circuit is assigned, and it is used for the circuit selection control.

The table also contains the trunk circuit identification code (TCIC). The TCIC identifies the trunk circuit which is typically a DS0. The echo canceller (EC) label entry identifies the echo canceller, if any, which is connected to the circuit. The interworking unit (IWU) label and the interworking unit (IWU) port identify the hardware location and the port number, respectively, of the interworking unit. The DS1/E1 label and the DS1/E1 channel denote the DS1 or the E1 and the channel within the DS1 or E1, respectively, that contains the circuit. The initial state specifies the state of the circuit when it is installed. Valid states include blocked if the circuit is installed and blocked from usage, unequipped if the circuit is reserved, and normal if the circuit is installed and available from usage.

FIG. 16 depicts an example of an ATM trunk circuit table. The ATM trunk circuit table is used to access information about the originating circuit for originating circuit call processing. It also is used to provide information about the terminating circuit for terminating circuit call processing.

The trunk group number of the circuit associated with the call is used to enter the table. The group size denotes the number of members in the trunk group. The starting trunk circuit identification code (TCIC) is the starting TCIC for the trunk group, and it is used in the routing label of an ISUP message. The transmit interface label identifies the hardware location of the virtual path on which the call will be transmitted. The transmit interface label may designate either an interworking unit interface or a CAM interface for the designated trunk members. The transmit virtual path identifier (VPI) is the VP that will be used on the transmission circuit side of the call. The receive interface label identifies the hardware location of the virtual path on which the call will be received. The receive interface label may designate either an interworking unit interface or a CAM interface for the designated trunk members. The receive virtual path identifier (VPI) is the VP that will be used on the reception circuit side of the call. The initial state specifies the state of the circuit when it is installed. Valid states include blocked if the circuit is installed and blocked from usage, unequipped if the circuit is reserved, and normal if the circuit is installed and available from usage.

FIG. 17A depicts an example of a trunk group table. The trunk group number of the trunk group associated with the circuit is used to key into the trunk group table. The administration information field is used for information purposes concerning the trunk group and typically is not used in call processing. The associated point code is the point code for the far end switch or call processor to which the trunk group is connected. The common language location identifier (CLLI) entry is a standardized Bellcore entry for the associated office to which the trunk group is connected. The trunk type identifies the type of the trunk in the trunk group. The trunk type may be a TDM trunk, an ATM trunk from the interworking unit, or an ATM trunk from the CAM.

The associated numbering plan area (NPA) contains information identifying the switch from which the trunk group is originating or to which the trunk group is terminating. The associated jurisdiction information parameter (JIP) contains information identifying the switch from which the trunk group is originating or to which the trunk group is terminating. If an ISUP JIP is received, an outgoing JIP has the same value as the received JIP. If an ISUP JIP is not received in an IAM, and a default JIP value is present, then call processing will populate the JIP of the outgoing IAM with the default value from the trunk group table. If a JIP is not received, and there is no default JIP value, then an outgoing JIP is not transmitted.

The time zone label identifies the time zone that should be used when computing a local date and a local time for use with a day of year table, the day of week table, and the time of day table. The echo canceller information field describes the trunk group echo cancellation requirements. Valid entries for the echo canceller information include normal for a trunk group that uses internal echo cancellation, external for a trunk group that requires external echo cancellers, and disable for a trunk group that requires no echo cancellation for any call passing over the group.

FIG. 17B is a continuation of FIG. 17A for the trunk group table. The satellite entry specifies that the trunk group for the circuit is connected through a satellite. If the trunk group uses too many satellites, then a call should not use the identified trunk group. This field is used in conjunction with the nature of connection satellite indicator field from the incoming IAM to determine if the outgoing call can be connected over this trunk group. The select sequence indicates the methodology that will be used to select a connection. Valid entries for the select sequence field include the following: most idle, least idle, ascending, or descending. The interworking unit (IWU) priority signifies that outgoing calls will attempt to use a trunk circuit on the same interworking unit before using a trunk circuit on a different interworking unit.

Glare resolution indicates how a glare situation is to be resolved. Glare is the dual seizure of the same circuit. If the glare resolution entry is set to "even/odd," the switch or the call processor with the higher point code value will control the even number TCICs within the trunk group. The switch or call processor with the lower point code value will control the odd number TCICs. If the glare resolution entry is set to "all," the call processor controls all of the TCICs within the trunk group. If the glare resolution entry is set to "none," the call processor will have no glare control and will yield to all double seizures within the trunk group.

Continuity control indicates whether continuity is to be checked. Continuity for outgoing calls on the originating call processor are controlled on a trunk group basis. This field specifies whether continuity is not required or whether continuity is required and the frequency of the required check. The field identifies a percentage of the calls that require continuity check.

The reattempt entry specifies how many times the outgoing call will be re-attempted using a different circuit from the same trunk group after a continuity check failure, a glare, or other connection failure. The ignore local number portability (LNP) information specifies whether or not the incoming LNP information is ignored. The treatment label is a label into the treatment table for the trunk group used on the call. Because specific trunk group connections may require specific release causes or treatments for a specific customer, this field identifies the type of treatment that is required. The message mapping label is a label into the message mapping table which specifies the backward message configuration that will be used on the trunk group.

FIG. 17C is a continuation of FIG. 17B for the trunk group table. The queue entry signifies that the terminating part of the trunk group is capable of queuing calls originating from a subscriber that called a number which terminates in this trunk group. The ring no answer entry specifies whether the trunk group requires ring no answer timing. If the entry is set to 0, the call processing will not use the ring no answer timing for calls terminated on the trunk group. A number other than 0 specifies the ring no answer timing in seconds for calls terminating on this trunk group. The voice path cut through entry identifies how and when the terminating call's voice path will be cut through on the trunk group. The options for this field include the following: connect for a cut through in both directions after receipt of an ACM, answer for cut through in the backward direction upon receipt of an ACM, then cut through in the forward direction upon receipt of an ANM, or immediate for cut through in both directions immediately after an IAM has been sent.

The originating class of service (COS) label provides a label into a class of service table that determines how a call is handled based on the combination of the originating COS and the terminating COS from another trunk group. Based on the combination of this field and the terminating COS of another trunk group's field, the call will be handled differently. For example, the call may be denied, route advanced, or otherwise processed. The terminating class of service (COS) label provides a label into a class of service table that determines how a call is handled based on the combination of the originating COS from another trunk group and the terminating COS from the present trunk group. Based on a combination of this field and the originating COS the call will be handled differently. For example, the call may be denied, route advanced, or otherwise processed.

Call control provides an index to a specific trunk group level traffic management control. Valid entries include normal for no control applied, skip control, applied wide area telecommunications service (WATS) reroute functionality, cancel control, reroute control overflow, and reroute immediate control. The next function points to the next table, and the next label points to an entry or a range of entries in that table.

FIG. 18 depicts an example of a carrier table. The carrier label is the key to enter the table. The carrier identification (ID) specifies the carrier to be used by the calling party. The carrier selection entry identifies how the caller specifies the carrier. For example, it identifies whether the caller dialed a prefix digit or whether the caller was pre-subscribed. The carrier selection is used to determine how the call will be routed. The next function points to the next table, and the next label defines an area in that table for further call processing.

FIG. 19 depicts an example of an exception table. The exception label is used as a key to enter the table. The calling party's category entry specifies how to process a call from an ordinary subscriber, an unknown subscriber, or a test phone. The called number nature of address differentiates between 0+ calls, 1+ calls, test calls, local routing number (LRN) calls, and international calls. For example, international calls might be routed to a pre-selected international carrier. The called number "digits from" and "digits to" focus further processing unique to a defined range of called numbers. The "digits from" field is a decimal number ranging from 1-15 digits. It can be any length and, if filled with less than 15 digits, is filled with 0s for the remaining digits. The "digits to" is a decimal number ranging from 1-15 digits. It can be any length and, if filled with less than 15 digits, is filled with 9s for the remaining digits. The next function and next label entries point to the next table and the next entry within that table for the next routing function.

FIG. 20 depicts an example of the originating line information (OLI) table. The OLI label is used as a key to enter the table from a prior next function operation. The originating line information entry specifies the information digits that are being transmitted from a carrier. Different calls are differentiated based on the information digits. For example, the information digits may identify an ordinary subscriber, a multi-party line, N00 service, prison service, cellular service, or private pay station. The next function and next label entries point to the next table and the area within that table for the next routing function.

FIG. 21 depicts an example of an automatic number identification (ANI) table. The ANI label is used as a key to enter the table from a prior next option. The charge calling party number "digits from" and "digits to" focus further processing unique to ANI within a given range. These entries are looked at to determine if the incoming calling number falls within the "digits from" and "digits to" fields. The time zone label indicates the entry in the time zone table that should be used when computing the local date and time. The time zone label overrides the time zone information from the trunk group table 1106.

The customer information entry specifies further customer information on the originating side for call process routing. The echo cancellation (EC) information field specifies whether or not to apply echo cancellation to the associated ANI. The queue entry identifies whether or not queuing is available to the calling party if the called party is busy. Queuing timers determine the length of time that a call can be queued. The treatment label defines how a call will be treated based on information in the treatment table. For example, the treatment label may send a call to a specific recording based on a dialed number. The next function and next label point to the next table and an area within that table for further call processing.

FIG. 22 depicts an example of a called number screening table. The called number screening label is used as a key to enter the table. The called number nature of address indicates the type of dialed number, for example, national versus international. The nature of address entry allows the call process to route a call differently based on the nature of address value provided. The "digits from" and "digits to" entries focus further processing unique to a range of called numbers. The "digits from" and "digits to" columns both contain called number digits, such as NPA-NXX ranges, that may contain ported numbers and are checked for an LRN. This table serves as the trigger detection point (TDP) for an LNP TCAP when, for example, NPA-NXXs of donor switches that have had subscribers port their numbers are data filled in the "digits from" and "digits to" fields. The delete digits field provides the number of digits to be deleted from the called number before processing continues. The next function and next label point to the next table and the area within that table for further call processing.

FIG. 23 depicts an example of a called number table. The called number label is used as a key to enter the table. The called number nature of address entry indicates the type of dialed number, for example, national versus international. The "digits from" and "digits to" entries focus further processing unique to a range of numbers, including LRNs. The next function and next label point to a next table and the area within that table used for further call processing.

FIG. 24 depicts an example of a day of year table. The day of year label is used as a key to enter the table. The date field indicates the local date which is applicable to the action to be taken during the processing of this table. The next function and next label identify the table and the area within that table for further call processing.

FIG. 25 depicts an example of a day of week table. The day of week label is a key that is used to enter the table. The "day from" field indicates the local day of the week on which the action to be taken by this table line entry is to start. The "day to" field indicates the local day of the week on which the action to be taken by this table line entry is to end. The next function and next label identify the next table and the area within that table for further call processing.

FIG. 26 depicts an example of a time of day table. The time of day label is used as a key to enter the table from a prior next function. The "time from" entry indicates the local time on which an action to be taken is to start. The "time to" field indicates the local time just before which the action to be taken is to stop. The next function and next label entries identify the next table and the area within that table for further call processing.

FIG. 27 depicts an example of a time zone table. The time zone label is used as a key to enter the table and to process an entry so that a customer's local date and time may be computed. The coordinated universal time (UTC) indicates a standard offset of this time zone from the UTC. The UTC is also known as Greenwich mean time, GMT, or Zulu. The UTC should be positive for time zones east of Greenwich, such as Europe and Asia, and negative for time zones west of Greenwich, such as North America. The daylight savings entry indicates whether daylight savings time is used during the summer in this time zone.

FIG. 28 depicts an example of a routing table. The routing label is used as a key to enter the table from a prior next function. The route number specifies a route within a route list. Call processing will process the route choices for a given route label in the order indicated by the route numbers. The next function and next label identify the next table and the area within that table for further call processing. The signal route label is associated with the next action to be taken by call processing for this call. The signal route label provides the index to access the message mapping label. The signal route label is used in order to modify parameter data fields in a signaling message that is being propagated to a next switch or a next call processor.

FIG. 29 depicts an example of a trunk group class of service (COS) table. The originating trunk COS label and the terminating trunk COS label are used as keys to enter the table and define call processing. The next function identifies the next action that will be taken by call processing for this call. Valid entries in the next function column may be continued, treat, route advanced, or routing. Based on these entries call processing may continue using the current trunk group, send the calls to treatment, skip the current trunk group and the routing table and go to the next trunk group on the list, or send the call to a different label in the routing table. The next label entry is a pointer that defines the trunk circuit group that the next function will use to process the call. This field is ignored when the next function is continued or route advanced.

FIG. 30 depicts an example of a treatment table. The treatment label is a key that is used to enter the table. The treatment label is a designation in a call process that determines the disposition of the call. The error/cause label correspond either to internally generated error conditions and call processing or to incoming release cause values. For each treatment label, there will be a set of error conditions and cause values that will be associated with a series of labels for the call processing error conditions and a series of labels for all incoming release message cause values. The next function and next label point to the next table and the area within that table for further call processing.

FIG. 31 depicts an example of an outgoing release table. The outgoing release label is used as a key to enter the table for processing. The outgoing cause value location identifies the type of network to be used. For example, the location entry may specify a local or remote network or a private, transit, or international network. The coding standard identifies the standard as an International Telecommunications Union (ITU) standard or an American National Standards Institute (ANSI) standard. The cause value designates error, maintenance, or non-connection processes.

FIG. 32 depicts an example of a percent control table. The percent label is used as a key to enter the table. The control percentage specifies the percentage of incoming calls that will be affected by the control. The control next function allows attempts for call connection to be routed to another table during call processing. The control next label points to an area within that table for further call processing. The passed next function allows only incoming attempts to be routed to another table. The next label points to an area in that table for further call processing.

FIG. 33 depicts an example of a call rate table. The call rate label is used as a key to enter the table. The call rate specifies the number of calls that will be passed by the control on or for completion. Call processing will use this information to determine if the incoming call number falls within this control. The control next function allows a blocked call attempt to be routed to another table. The control next label is a pointer that defines the area in the next table for further call processing. The passed next function allows only an incoming call attempt to be rerouted to another table. The passed next function is a pointer that defines an area in that table for further call processing.

FIG. 34 depicts an example of a database services table. The database services label is used as a key to enter the table. The service type determines the type of logic that is applied when building and responding to database queries. Service types include local number portability and N00 number translation. The signaling connection control part (SCCP) label identifies a location within an SCCP table for further call processing. The transaction capabilities application part (TCAP) label identifies a location within a TCAP table for further processing. The next function identifies the location for the next routing function based on information contained in the database services table as well as information received from a database query. The next label entry specifies an area within the table identified in the next function for further processing.

FIG. 35A depicts an example of a signaling connection control part (SCCP) table. The SCCP label is used as a key to enter the field. The message type entry identifies the type of message that will be sent in the SCCP message. Message types include Unitdata messages and Extended Unitdata messages. The protocol class entry indicates the type of protocol class that will be used for the message specified in the message type field. The protocol class is used for connectionless transactions to determine whether messages are discarded or returned upon an error condition. The message handling field identifies how the destination call processor or switch is to handle the SCCP message if it is received with errors. This field will designate that the message is to be discarded or returned. The hop counter entry denotes the number of nodes through which the SCCP message can route before the message is returned with an error condition. The segmentation entry denotes whether or not this SCCP message will use segmentation and send more than one SCCP message to the destination.

FIG. 35B is a continuation of FIG. 35A for the SCCP table. The intermediate signaling network identification (ISNI) fields allow the SCCP message to traverse different networks in order to reach a desired node. The ISNI type identifies the type of ISNI message format that will be used for this SCCP message. The route indicator subfield identifies whether or not this SCCP message requires a special type of routing to go through other networks. The mark identification subfield identifies whether or not network identification will be used for this SCCP message. The label subfield identifies a unique address into the ISNI table when the route indicator sub-field is set to "constrained" and the mark identification subfield is set to "yes."

FIG. 35C is a continuation of FIG. 35B for the SCCP table. FIG. 35C identifies the called party address field and subfields to provide information on how to route this SCCP message. The address indicator subsystem number (SSN) indicates whether or not a subsystem number will be included in the called party address. The point code entry indicates whether or not a point code will be included in the calling party address. The global title indicator subfield identifies whether or not a global title translation will be used to route the SCCP message. If a global title translation is chosen, this subfield also identifies the type. The routing indicator subfield identifies the elements that will be used to route the message. Valid entries include global title and point code. The national/international subfield identifies whether the SCCP message will use national or international routing and set up.

The subsystem number field identifies the subsystem number for the SCCP message. The point code number indicates the destination point code to which the SCCP message will be routed. This field will be used for routing messages that do not require SCCP translation.

The global title translation field allows intermediate nodes to translate SCCP messages so that the messages can be routed to the correct destination with the correct point code. The global title translation type entry directs the SCCP message to the correct global title translation function. The encode scheme identifies how the address type will be encoded. The number plan subfield identifies the numbering plan that will be sent to the destination node. The address type subfield will identify which address type to use for address digits and the SCCP routing through the network.

FIG. 35D is a continuation of FIG. 35C for the SCCP table. FIG. 35D identifies the calling party address field which contains the routing information that the destination database uses to retain the SCCP message. The address indicator subsystem number (SSN) indicates whether or not a subsystem number will be included in the called party address. The point code subfield indicates whether or not a point code will be included in the calling party address. The global title indicator subfield identifies whether or not global title translation will be used to route the SCCP message. The routing indicator subfield identifies which elements will be used throughout the message. This field may include global title elements or point code elements. The national/international subfield identifies whether the SCCP will use national or international routing and set up.

The subsystem number identifies a subsystem number for the SCCP message. The point code number field indicates the destination point code to which the SCCP message will be routed. The global title translations allow the intermediate nodes to translate SCCP messages and to route the messages to the correct destination. The global title translation type directs the SCCP message to the correct global title translation function. The encode scheme identifies how the address type will be encoded. The number plan identifies the number plan that will be sent to the destination node. The address type subfield identifies the address type to use for address digits in the SCCP routing through the network.

FIG. 36 depicts an example of an intermediate signaling network identification (ISNI) table. The ISNI table contains a list of networks that will be used for routing SCCP messages to the destination node. The ISNI label is used as a key to enter the table. The network fields 1-16 identify the network number of up to 16 networks that may be used for routing the SCCP message.

FIG. 37 depicts an example of a transaction capabilities application part (TCAP) table. The TCAP label is used as a key to enter the table. The TCAP type identifies the type of the TCAP that will be constructed. The TCAP types include advanced intelligent network (AIN) and distributed intelligent network architecture (DINA). The tag class indicates whether the message will use a common or proprietary structure. The package type field identifies the package type that will be used in the transaction portion of the TCAP message. The component type field identifies the component type that will be used in the component portion of the TCAP message. The message type field identifies the type of TCAP message. Message types include variable options depending on whether they are AIN message types or DINA message types.

FIG. 38 depicts an example of an external echo canceller table. The echo canceller type specifies if an external echo canceller is being used on the circuit and, if so, the type of echo canceller. The echo canceller label points to a location in the controllable ATM matrix table for further call processing. The RS-232 address is the address of the RS-232 interface that is used to communicate with the external echo canceller. The module entry is the module number of the external echo canceller.

FIG. 39 depicts an example of an interworking unit interface table. The interworking unit (IWU) is a key that is used to enter the table. The IWU identification (ID) identifies which interworking unit is being addressed. The internet protocol (IP) sockets 1-4 specify the IP socket address of any of the four connections to the interworking unit.

FIG. 40 depicts an example of a controllable ATM matrix (CAM) interface table. The CAM interface label is used as a key to enter the table. The CAM label indicates which CAM contains the interface. The logical interface entry specifies a logical interface or port number in the CAM.

FIG. 41 depicts an example of a controllable ATM matrix (CAM) table. The CAM label is used as a key to enter the table. The CAM type indicates the type of CAM control protocol. The CAM address identifies the address of the CAM.

FIG. 42A depicts an example of a call processor or switch site office table. The office CLLI name identifies a CLLI of the associated office for the call processor or switch. The call processor or switch site node identifier (ID) specifies the call processor or switch node identifier. The call processor or switch origination identifier (ID) specifies a call processor or switch origination identifier. The software identifier (ID) specifies a software release identifier. The call processor identifier (ID) specifies the call processor or switch identifier that is sent to the inter working units.

FIG. 42B is a continuation of FIG. 42A of the call processor or switch site office table. The automatic congestion control (ACC) specifies whether ACC is enabled or disabled. The automatic congestion control level (ACL) 1 onset identifies an onset percentage value of a first buffer utilization. The ACL 1 abate entry specifies an abatement percentage of utilization for a first buffer. The ACL 2 onset entry specifies an onset level for a second buffer. The ACL 2 abate entry specifies an abatement level percentage of buffer utilization for a second buffer. The ACL 3 onset entry specifies an onset level percentage of buffer utilization for a third buffer. The ACL 3 abate entry specifies an abatement level percentage of buffer utilization for a third buffer.

FIG. 42C is a continuation of FIG. 42B for the call processor or switch site office table. The maximum trunks for the off hook queuing (max trunks OHQ) specifies a maximum number of trunk groups that can have the off hook queuing enabled. The OHQ timer one (TQ1) entry specifies the number of milliseconds for the off hook timer number one. The OHQ timer two (TQ2) entry specifies the number of seconds for the off hook timer number two. The ring no answer timer specifies the number of seconds for the ring no answer timer. The billing active entry specifies whether ECDBs are being sent to the call processing control system (CPCS). The network management (NWM) allow entry identifies whether or not a selective trunk reservation and group control are allowed or disallowed. The billing failure free call entry specifies if a call will not be billed if the billing process is unavailable. The billing failure free call will either be enabled for free calls or disabled so that there are no free calls.

FIG. 42D is a continuation of FIG. 42C for the call processor or switch site office table. The maximum (max) hop counts identifies the number of call processor or switch hops that may be made in a single call. The maximum (max) table lookups identifies the number of table lookups that may performed for a single call. This value is used to detect loops in routing tables.

FIGS. 43A-43B depict an example of an advanced intelligent network (AIN) event parameters table. The AIN event parameters table has two columns. The first identifies the parameters that will be included in the parameters portion of the TCAP event message. The second entry may include information for analysis.

FIG. 44 depicts an example of a message mapping table. This table allows the call processor to alter information in outgoing messages. The message type field is used as a key to enter the table and represents the outgoing standard message type. The parameters entry is a pertinent parameter within the outgoing message. The indexes point to various entries in the trunk group and determine if parameters are passed unchanged, omitted, or modified in the outgoing messages.

Those skilled in the art will appreciate that variations from the specific embodiments disclosed above are contemplated by the invention. The invention should not be restricted to the above embodiments, but should be measured by the following claims.

The invention claimed is:

1. A method of operating a communication system comprising a signaling processor and an interworking unit, the method comprising:
  in the signaling processor, receiving and processing signaling for a call to select a connection and a first bandwidth rate and transferring a first message to the interworking unit indicating the connection and the first bandwidth rate;
  in the interworking unit, receiving the first message and user communications for the call, and in response, transferring the user communications over the connection at the first bandwidth rate;
  in the interworking unit, detecting a trigger in the user communications, and in response, transferring the user communications over the connection at a second bandwidth rate and transferring a second message to the signaling processor indicating the second bandwidth rate; and
  in the signaling processor, selecting a billing rate for the call based on the second message.

2. The method of claim 1 wherein selecting the first bandwidth rate comprises processing a caller number to select the first bandwidth rate.

3. The method of claim 1 wherein the trigger comprises a tone.

4. The method of claim 1 wherein the user communications comprise voice communications.

5. The method of claim 1 wherein the first bandwidth rate is lower than the second bandwidth rate.

6. The method of claim 1 wherein the connection comprises a virtual connection.

7. The method of claim 1 wherein the connection comprises an asynchronous transfer mode connection.

8. The method of claim 1 wherein the signaling comprises signaling system seven signaling.

9. A communication system comprising:
  a signaling processor configured to receive and process signaling for a call to select a connection and a first bandwidth rate and to transfer a first message indicating the connection and the first bandwidth rate;
  an interworking unit configured to receive the first message and user communications for the call, and in response, to transfer the user communications over the connection at the first bandwidth rate;

the interworking unit is further configured to detect a trigger in the user communications, and in response, to transfer the user communications over the connection at a second bandwidth rate and to transfer a second message to the signaling processor indicating the second bandwidth rate; and the signaling processor is further configured to select a billing rate for the call based on the second message.

10. The communication system of claim 9 wherein the signaling processor is configured to process a caller number to select the first bandwidth rate.

11. The communication system of claim 9 wherein the trigger comprises a tone.

12. The communication system of claim 9 wherein the user communications comprise voice communications.

13. The communication system of claim 9 wherein the first bandwidth rate is lower than the second bandwidth rate.

14. The communication system of claim 9 wherein the connection comprises a virtual connection.

15. The communication system of claim 9 wherein the connection comprises an asynchronous transfer mode connection.

16. The communication system of claim 9 wherein the signaling comprises signaling system seven signaling.

* * * * *